United States Patent
Vanoli et al.

[11] Patent Number: 5,808,762
[45] Date of Patent: Sep. 15, 1998

[54] TELECOMMUNICATION SYSTEM AND METHOD FOR WAVELENGTH-DIVISION MULTIPLEXING TRANSMISSIONS WITH A CONTROLLED SEPARATION OF THE OUTGOING CHANNELS AND CAPABLE OF DETERMINING THE OPTICAL SIGNAL/NOISE RATIO

[75] Inventors: Stefano Vanoli, Verdellino; Mario Tamburello, Vermercate, both of Italy

[73] Assignee: Pirelli Cavi S.p.A.

[21] Appl. No.: 845,716

[22] Filed: Apr. 25, 1997

Related U.S. Application Data

[63] Continuation of Ser. No. 561,085, Nov. 20, 1995, Pat. No. 5,712,716.

[30] Foreign Application Priority Data

Nov. 25, 1994 [IT] Italy .................................. MI94A2392

[51] Int. Cl.$^6$ .................................................. H04J 14/02
[52] U.S. Cl. ........................... 359/124; 359/125; 359/134; 359/133
[58] Field of Search ..................................... 359/124–125, 359/133–134, 161, 157, 173, 189, 194, 110

[56] References Cited

U.S. PATENT DOCUMENTS 4,841,519  6/1989  Nishio ..................................... 359/124

FOREIGN PATENT DOCUMENTS 0604040  6/1994  European Pat. Off. ............... 359/124

*Primary Examiner*—Kinfe-Michael Negash
*Attorney, Agent, or Firm*—Brooks Haidt Haffner & Delahunty

[57] ABSTRACT

A multi-wavelength optical telecommunication method includes the steps of generating at least one optical transmission signal in a predetermined wavelength band, transmitting the optical transmission signal through an optical fibre to a receiving station, receiving the optical transmission signal through a passband filter and filtering the signal to let the transmission signal alone pass. The wavelength band is scanned in order to identify in the band a recognizable portion of the optical spectrum being received, thus determining, based on the operating conditions corresponding to the recognizable spectrum portion, a search range of the transmission signal within which the transmission signal is searched out and recognized based on its spectral profile.

33 Claims, 9 Drawing Sheets

Wavelength (μm)

TELECOMMUNICATION SYSTEM AND METHOD FOR WAVELENGTH-DIVISION MULTIPLEXING TRANSMISSIONS WITH A CONTROLLED SEPARATION OF THE OUTGOING CHANNELS AND CAPABLE OF DETERMINING THE OPTICAL SIGNAL/ NOISE RATIO

This application is a continuation of application Ser. No. 08/561,085, filed Nov. 20, 1995, now U.S. Pat. No. 5,712,716.

DESCRIPTION

The present invention relates to an optical telecommunication system and method, particularly adapted for a wavelength-division multiplexing (or WDM) transmission in which the different channels at reception are recognized and separated, based on the spectral profile of the optical signal, and in which measurement of the optical signal/noise ratio of each channel is obtained.

For a WDM transmission several channels, or several transmission signals independent of one another, are required to be sent over the same line consisting of an optical fibre by multiplexing in the domain of optical frequencies. The transmitted channels can be either digital or analog and are distinguished from each other because each of them is associated with a specific wavelength, separated from that of the other channels.

In order to enable transmission of a great number of channels using the so-called third transmission window of the silica-based fibres and the useful band in the optical amplifiers, the wavelength separation between the channels themselves is conveniently in the order of nanometers.

For a correct reception of such transmission signals, it is therefore necessary to carry out a separation between said channels, so as to convey them to the respective users.

For the purpose, low-band optical filters can be utilized through which only the selected channel can pass, so as to ensure the absence of undesired signals, that would constitute a noise, being overlapped with the selected channel.

For use of such filters, however, both a high stability in the wavelength of the transmitted signal and a high inherent stability of the passband of the filter themselves is required.

The above problem is described for example in Patent Application GB 2260046 suggesting to overlap a pilot signal with data to be transmitted, by the detection of said pilot signal the receiver being able to adjust the filter passband.

Known optical filters, in addition, suffer from shift problems, based on which a selected wavelength for the passband keeps constant only over a limited period of time after setting. Said filters, in particular in the case they are provided with piezoelectric actuators or the like, are also subjected to hysteries phenomena. Based on said phenomena, the selected value of a passband wavelength not only depends on the value of the relevant command quantity (a voltage for example), but also on the temporal law by means of which such a quantity is applied to the filters themselves.

In addition, in an optical telecommunication system the optical signal/noise ratio should be checked, at the exit of an amplification stage for example, while at the same time the same filtering conditions as applied to the receiver are being applied, so that the system functionality can be checked.

Such a check however, generally can be carried out only with the use of expensive laboratory equipments.

Patent Application GB 2272590 discloses a method of measuring the signal/noise ratio comprising the steps of selectively filtering a transmitted signal with a notch (a narrow-band-pass filter) and measuring the signal power within said band for the filtered and unfiltered signal, in order to ascertain the signal/noise ratio in an amplifier.

Upon experiments carried out by the Applicant, however, the use of optical filters to this purpose proved to be subjected to the above problems concerning temporal stability and hysteresis and did not give appropriate results.

In one aspect, the present invention relates to a method and an apparatus for receiving transmission signals in a WDM system, in which the passband of an optical filter is continuously checked and adjusted by recognizing a sure reference value in the scanned wavelength band and, based on this recognition, the fine search range of the desired channel is detected, which range is recognized based on its spectral profile in the absence of check signals overlapped therewith.

In another aspect, the present invention consists in detecting the spectral profile of an optical signal passing through a tunable passband optical filter and recognizing the spectral profile thereof, thereby determining, based on said profile, the optical signal/noise ratio of the signal itself.

In particular, in one aspect the present invention relates to an optical telecommunication method comprising the steps of:

generating at least one optical transmission signal, at a predetermined wavelength included in a predetermined wavelength band;

transmitting said optical transmission signal through an optical fibre to a receiving station;

feeding an optical signal comprising said optical transmission signal to a respective one of the receiving units in said station, through a passband filter;

receiving in said receiving unit the optical transmission signal passing through said filter;

said optical signal having a spectrum including at least one recognizable portion at a known wavelength in said predetermined wavelength band, characterized in that said filter is a filter tunable to several wavelengths in a search band including said spectrum, by command means operable under several operating conditions, and in that said filtering step comprises:

scanning said predetermined wavelength band by varying said operating conditions;

identifying said recognizable spectrum portion;

determining, based on the operating conditions corresponding to said recognizable spectrum portion, a search range for said transmission signal;

scanning said search range by varying said operating conditions;

recognizing said optical transmission signal in said search range and identifying the relevant operating conditions; and maintaining the operating conditions at said optical transmission signal.

More particularly, said steps of scanning said predetermined wavelength band and identifying said recognizabile spectrum portion comprise:

actuating said command means at least at two operating conditions corresponding to through-wavelengths of said filter included within said search band;

detecting the optical through-power values at each of said operating conditions;

identifying between said optical power values a value corresponding to said recognizable portion of said spectrum and the operating conditions thereof.

In particular, said step of determining a search range comprises the step of determining, starting from the operating conditions of said recognizable portion, new operating conditions corresponding to a range of said spectrum in which said optical transmission signal can be individually present and applying said conditions to said actuators.

In a preferred embodiment, the optical telecommunication method according to the invention comprises amplifying said signal at least once by at least one active-fibre optical amplifier having a spontaneous-emission spectrum in said band including at least one peak of known wavelength constituting said recognizable spectrum portion.

Preferentially, said filter is a tunable optical filter and said command means is embodied by piezoelectric actuators.

In a preferred embodiment, said filtering step comprises:

applying to said actuators two or more piloting voltages included between the extreme values of predetermined voltages;

detecting the optical power values of the signal passing through the filter at said voltages;

recognizing said recognizable spectrum portion and the piloting voltage corresponding thereto;

modifying said predetermined extreme voltage values depending on the value of said piloting voltage corresponding to said recognizable portion;

repeating the cycle a predetermined number of times;

determining a search voltage range for a signal;

recognizing said signal in said range; and maintaining said filter at said signal.

Preferably, said recognizing step comprises:

applying to said actuators piloting voltages included in said search voltage range and detecting the optical through-powers corresponding thereto; and recognizing as a signal each maximum value of the optical through-power.

In addition and in particular, said maintaining step comprises applying to said actuators the piloting voltage corresponding to said recognized maximum of optical power and periodically varying said voltage according to predetermined increments, by adopting the piloting voltage value corresponding to the detected maximum of optical through-power.

Preferentially, said filtering step comprises varying the piloting voltage between said extreme values by means of a predetermined temporal law. Preferably and in particular, said piloting voltage is varied according to increments fixed in time and, more preferably, said piloting voltage is varied according to a mean temporal gradient predetermined in each step.

In particular, said step of determining a search range comprises detecting a spontaneous-emission spectrum, identifying the operating conditions corresponding to the extremes of said spontaneous-emission spectrum and calculating the operating conditions corresponding to one portion of said spectrum in which said transmission signal can be individually localized.

In one aspect of the method of the present invention, said step of recognizing said optical transmission signal comprises:

detecting the optical power passing through the filter in a group of at least three consecutive operating conditions;

separating an optical through-power value detected at an intermediate operating condition between said consecutive operating conditions, from the optical through-power values detected at least at two external operating conditions, between which said intermediate condition is included;

calculating an optical interpolation power value at said intermediate operating condition;

comparing said detected optical through-power value with said optical interpolation power value; and recognizing as the operating conditions corresponding to the optical transmission signal, the intermediate operating conditions in which said detected optical through-power value and said optical interpolation power value are in a predetermined relation with respect to each other.

In a particular embodiment, said predetermined relation comprises a higher ratio between said optical through-power value and said optical interpolation power value than a predetermined threshold value.

Alternatively, or in addition, said predetermined relation comprises a ratio between the integral of an interpolation curve of said optical through-power values detected at said consecutive operating conditions and the integral of an interpolation curve of said detected optical through-power values, except for the value or values corresponding to said intermediate operating condition or conditions in said group, said ratio being higher than a predetermined threshold value.

Preferably, said active-fibre amplifier comprises an erbium-doped fibre and, in particular, said recognizable spectrum portion consists of a spontaneous-emission peak of erbium, at a wavelength included between 1530 and 1540 nm.

In a second aspect, the present invention relates to a method of measuring the signal/noise ratio for a predetermined transmission signal over an optical telecommunication line, characterized in that it comprises drawing a fraction of the transmitted optical signal, filtering said optical signal through a tunable filter while detecting the optical through-power in a predetermined wavelength band including said transmission signal and comparing the optical power values detected at the wavelengths of said signal with the optical power values interpolated at the same wavelengths.

In particular, said method comprises:

detecting the optical power passing through the filter in a group of at least three consecutive operating conditions;

separating an optical through-power value detected at an intermediate operating condition between said consecutive operating conditions from optical through-power values detected at least at two external operating conditions, between which said intermediate condition is included;

calculating an optical interpolation power value at said intermediate operating condition;

comparing said detected optical through-power value with said optical interpolation power value;

recognizing as the operating conditions corresponding to the optical transmission signal, the intermediate operating conditions in which said detected optical through-power value and said optical interpolation power value are in a predetermined relation with respect to each other; and defining as the signal/noise ratio of said transmission signal, a ratio between values resulting from said detected optical through-power value and said optical interpolation power value.

Preferentially, said predetermined relation comprises a ratio between said detected optical through-power value and said optical interpolation power value higher than a predetermined threshold value.

Alternatively, said signal/noise ratio consists of the ratio between the integral of an interpolation curve of said optical through-power values detected at said consecutive operating conditions and the integral of an interpolation curve of said detected optical through-power values, with the exception of the value or values corresponding to said intermediate operating condition or conditions in said group.

In a third aspect, the present invention relates to an optical telecommunication system comprising:

an optical-signal-transmitting station comprising means for generating transmission signals at at least two wavelengths included in a predetermined bandwidth and means for conveying said signals to a single optical fibre line, a receiving station for said optical signals, and an optical fibre line connecting said transmitting and receiving stations, characterized in that said optical-signal-receiving station comprises means for separating said transmission signals from said single optical fibre line, comprising:

a signal splitter designed to split the incoming optical signal onto several optical outlets;

at least one tunable optical filter connected in series with at least one of said optical outlets, adapted to produce an optical output signal in a wavelength band of predetermined width and comprising respective commandable actuator means;

means for receiving at least one portion of said optical output signal from said filter; and means for commanding said actuator means of said filter, in connection with said receiving means.

Preferably, the system according to the present invention comprises at least one active-fibre optical amplifier interposed along said optical fibre line.

Preferentially, said amplifier is an erbium-doped active fibre amplifier.

In one embodiment of the system according to the present invention said tunable filter is a filter of the Fabry-Perot type.

Preferably and in particular said receiving means is designed to receive at least one portion of said outgoing optical signal from said filter and comprises a fused-fibre splitter, connected in series at the filter output, having an outlet connected with an optical check receiver.

More preferably, said splitter draws less than 5% of optical power to be sent to said optical check receiver.

In particular, said optical receiver comprises a photodiode for the electronic detection of the optical signal.

In particular, said Fabry-Perot filter has a free spectral range FSR greater than or equal to the spontaneous-emission band of said erbium-doped active fibre.

In a fourth aspect, the present invention relates to a device for a multi-wavelength optical reception, characterized in that it comprises:

a signal splitter adapted to split an incoming optical signal onto several optical outlets;

at least one tunable optical filter connected in series to at least one of said optical outlets, adapted to produce an optical output signal in a wavelength band of predetermined width, comprising respective commandable actuator means;

means for receiving at least one portion of said optical output signal from said filter; and means for commanding said actuator means for said filter, in connection with said receiving means.

In particular, the command means for said filter actuators comprises a microprocessor unit adapted to generate a command action on the actuators in response to the filter output signal.

In particular, said actuators for said filter are piezoelectric actuators.

In a preferred embodiment, said tunable filter is a filter of the Fabry-Perot type.

Preferentially, said means for receiving at least one portion of said optical output signal from said filter comprises a fused-fibre splitter connected in series at its exit from the filter, having an outlet connected to an optical check receiver.

Preferably, said splitter draws less than 5% of optical power to be sent to said optical check receiver.

In particular, said optical receiver comprises a photodiode for the electronic detection of the optical signal.

In particular, said Fabry-Perot filter has a free spectral range FSR greater than or equal to said predetermined bandwidth.

In a fifth aspect, the present invention relates to a device for measuring and checking the signal/noise ratio in a multi-wavelength telecommunication system, characterized in that it comprises:

means for extracting at least one portion of an optical signal from an optical fibre and adapted to convey it to an optical outlet;

a tunable optical filter, connected in series to said optical outlet, adapted to produce an optical output signal in a wavelength band of predetermined width, comprising respective commandable actuator means;

means for receiving at least one portion of said optical outgoing signal from said filter;

means for commanding said actuator means of said filter, in connection with said receiving means, for filtering through a predetermined wavelength band;

means for detecting the optical power passing through the filter at several wavelengths in said band;

means for interpolating optical power values in said band; and comparing means for carrying out a comparison between corresponding means relating to said optical through-power and said optical interpolated power.

In particular, the means for commanding the actuators of said filter comprises a microprocessor unit adapted to command the filter for periodically scanning at least one portion of said wavelength band, at steps of predetermined width.

In a particular embodiment, said actuator means for said filter are piezoelectric actuators.

In a preferred embodiment, said tunable filter is a Fabry-Perot filter.

Preferentially, said extraction means of at least one portion of said optical signal comprises a fused-fibre splitter, connected in series along the fibre and, more preferentially, said splitter draws less than 5% of optical power.

More details will be more fully understood from the following description, with reference to the accompanying drawings, in which.

a) Description of the System

Figure 1:
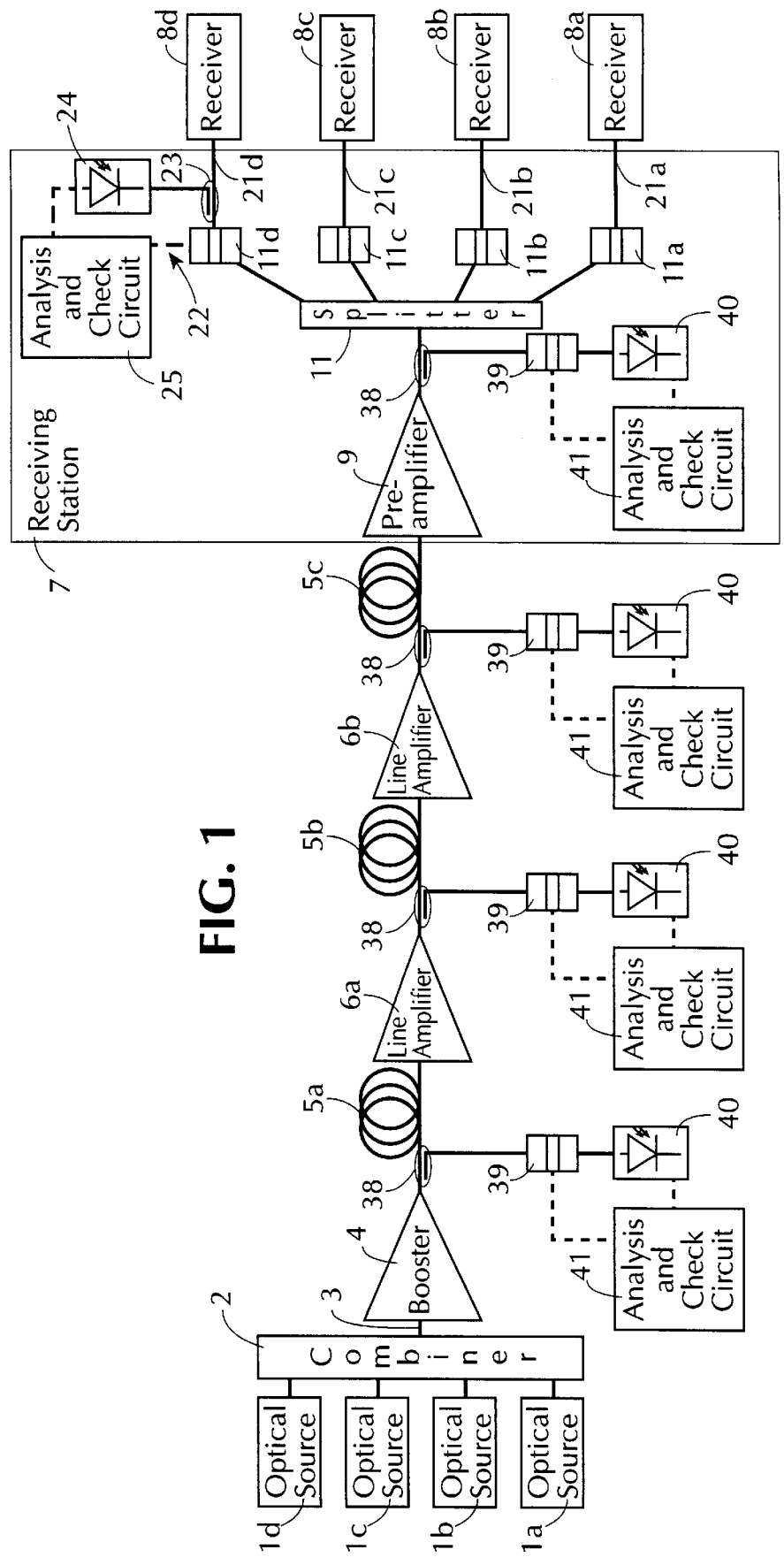
FIG. 1 is a diagram of a multiwavelength telecommunication system with check filters according to the present invention.

As shown in FIG. 1, in a multi-channel optical telecommunication system for a wavelength-division multiplexing transmission according to the present invention several optical-signal sources are provided (four sources in the present example) which have wavelengths $\lambda_1$, $\lambda_2$, $\lambda_3$, $\lambda_4$ included in the band of useful work of the amplifiers disposed in succession in the system.

Said optical signals, generated separately by respective sources, are fed to a signal combiner 2 or multiplexer, adapted to send the signals at the wavelengths $\lambda_1$, $\lambda_2$, $\lambda_3$, $\lambda_4$, simultaneously to a single optical output fibre 3.

Generally, the signal combiner 2 is a passive optical device by which the optical signals transmitted over respective optical fibres are overlapped in a single fibre. Devices of this kind consist for example of fused-fibre couplers, in planar optics, microoptics and the like.

By way of example, an appropriate combiner is combiner 1×4 SMTC-0104-1550A-H put on the market by E-TEK DYNAMICS INC., 1885 Lundy Ave, San Jose, Calif. (U.S.A.).

Said optical signals are sent through fibre 3 to a booster 4 raising the level of same to a value sufficient to enable a subsequent length of optical fibre separating from the following amplifying means to be travelled over, while keeping a power level sufficient to ensure the required transmissive quality.

Therefore, connected to the booster 4 is a first length 5a of optical line usually consisting of a mono-mode optical fibre of the step-index type, inserted in an appropriate optical cable which is some ten (or hundred) kilometers long; for example, about 100 kilometers long using the amplifying means described in the following and the stated power levels.

In some cases also optical fibres of the dispersion shifted type can be used.

At the end of said first length 5a of optical fibre, a first line amplifier 6a is present which is adapted to receive the signals attenuated during their travel over the fibre, and amplify them to a sufficient level for feeding them to a subsequent optical fibre length 5b having the same features as the preceding one and to the related line amplifier 6b, covering the required overall transmission distance until a receiving station 7 is reached in which the signals are shared out or split, depending on the various transmitted channels identified by the respective wavelengths, and sent to the respective receivers 8a, 8b, 8c, 8d.

The receiving station 7 comprises a pre-amplifier 9, adapted to receive the signals and amplify them, compensating for the loss resulting from the subsequent demultiplexing apparatus, by providing a power level suitable to the sensitivity of the receiving devices.

From pre-amplifier 9 the signals are sent to a device adapted to share out the optical signals fed to an input fibre, on several output fibres, separating them depending on the respective wavelengths. Such a device, also referred to as demultiplexer, in the present example consists of a fused-fibre splitter 10 dividing the input signal into signals on several output fibres, four fibres in the present example, each of said signals being fed to a respective bandpass filter 11a, 11b, 11c, 11d, centered on each of the wavelengths of interest.

For instance, for the splitter 10 a component of a type similar to the already described signal combiner 2 may be used, mounted in an inverted configuration.

In the following, bandpass filters adapted for use are described.

To the ends of the present invention and for the above described use, the booster 4 is for example an optical fibre amplifier of a commercially available type, having the following features:

input power −5 to +2 dBm output power 13 dBm work wavelength 1530–1560 nm.

An appropriate model is TPA/e-12, put on the market by the Applicant.

Said booster uses an erbium-doped active fibre, of the Al/Ge/Er type.

By "booster" it is intended an amplifier operating under saturation conditions, in which the output power depends on the pumping power, as described in detail in the European Patent n° EP 439,867 herein incorporated by reference.

To the ends of the present invention and for the above described use, by "pre-amplifier" it is intended an amplifier put at the end of the line, capable of increasing the signal to be fed to the receiver to a value conveniently higher than the sensitivity threshold of the receiver itself (for example, in the case of a transmission at 2.5 Gbit/s, the power reaching the receiver is between −26 and −11 dBm), while at the same time introducing the lowest possible noise and maintaining the signal equalization.

In the described experiment, for producing the pre-amplifier 9, a one-stage amplifier using the same active fibre as used in amplifiers 6a–6b described in the following was employed and it was mounted in a co-propagating configuration. For particular embodiments, a pre-amplifier expressly designed for the purpose can be adopted.

The configuration of the above described transmission system is particularly appropriate to provide the desired performance, especially for wavelength-multiplexing transmission over several channels, in the presence of a particular selection of the properties of the line amplifiers being a part thereof, especially with regard to the capability of transmitting the selected wavelengths without some of them being penalized or attenuated with respect to others.

In particular, a uniform behavior for all channels can be ensured, in a wavelength band included between 1530 and 1560 nm, in the presence of amplifiers adapted to operate in cascade, making use of line amplifiers capable of giving a substantially uniform (or "flat") response at the different wavelengths, when operating in cascade.

b) Line Amplifier

Figure 2:
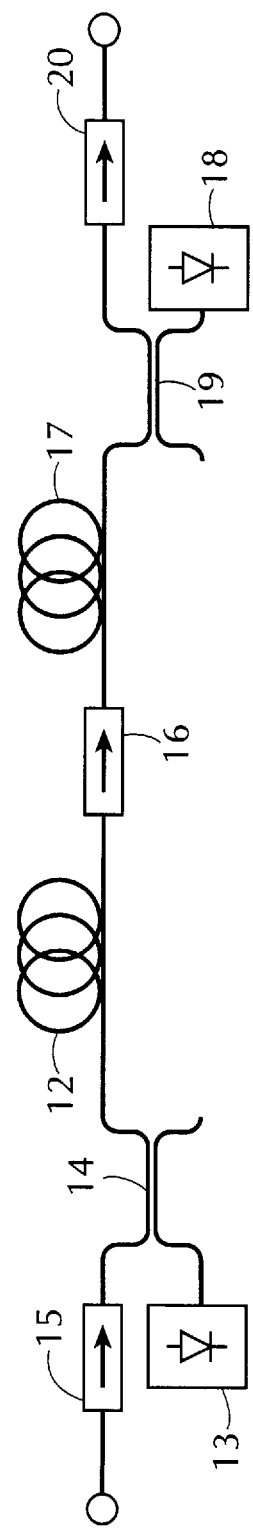
FIG. 2 is a diagram of a line amplifier for use in the system of FIG. 1.

An amplifier intended for the above purpose and provided for use as a line amplifier can be made according to the diagram shown in FIG. 2 and it comprises one erbium-doped active fibre 12 and a respective pump laser 13, connected thereto by a dichroic coupler 14. One optical isolator 15 is located upstream of the fibre 12, in the travel direction of the signal to be amplified, whereas a second optoisolator 16 is located downstream of the active fibre itself.

The amplifier further comprises a second erbium-doped active fibre 17 associated with a respective pump laser 18 by means of a dichroic coupler 19, also connected for counter-current pumping in the example shown. Downstream of the fibre 17 another optical isolator 20 is therefore present.

The pump lasers 13, 18 preferably are lasers of the Quantum Well type and have the following features:

emission wavelength $\lambda_p$=980 nm;

maximum optical output power $P_u$=80 mW

Lasers of the above type are produced for example by: LASERTRON INC., 37 North Avenue, Burlington, Mass. (U.S.A.).

The dichroic couplers 14, 19 in the example are fused-fibre couplers, formed of mono-mode fibres at 980 nm and in the 1530–1560 nm wavelength band, with variations <0.2 dB in the output optical power depending on polarization.

Dichroic couplers of the above type are known and commercially available and produced for example by GOULD Inc., Fibre Optic Division, Baymeadow Drive, Glem Bumie, Md. (U.S.A.), and by SIFAM Ltd., Fibre Optic Division, Woodland Road Torquay Devon (GB).

The optical isolators 15, 16, 20 are optical isolators of a type independent of the transmission signal polarization, and have an isolation greater than 35 dB and a reflectivity lower than −50 dB.

The isolators herein used are model MDLI-15 PIPT-A S/N 1016 available from ISOWAVE, 64 Harding Avenue, Dover, N.J., U.S.A.

In the described systems the line amplifiers are provided for operation with an optical overall output power of about 14 dBm, with a gain of about 30 dB.

In the above described amplifiers an erbium-doped active fibre has been used, as described in detail in the Italian Patent application N° M194A000712 of Apr. 14, 1994 filed in the name of the assignee of this application which is herein incorporated by reference, and the contents of which are hereinafter summarized.

The composition and optical features of the fibre used are summarized in the following Table 1.

TABLE 1

| FIBRE | $Al_2O_3$ |  | $GeO_2$ |  | $La_2O_3$ |  | $Er_2O_3$ |  | NA | $\lambda_c$ |
|---|---|---|---|---|---|---|---|---|---|---|
|  | % p | (% mol) | % p | (% mol) | % p | (% mol) | % p | (% mol) |  | nm |
| A | 4 | (2.6) | 18 | (11.4) | 1 | (0.2) | 0.2 | (0.03) | 0.219 | 911 |

% p = percent content by weight of oxide in the core (average)
% mol = percent content by moles of oxide in the core (average)
NA = Numerical Aperture $(n1^2-n2^2)^{1/2}$
$\lambda_c$ = cutoff wavelength (LP11 cut-off)

Tests on the compositions were carried out on a preform (before spinning of the fibre) by a micro-probe combined with a scanning electron microscope (SEM Hitach).

Tests were conducted at 1300 times magnification on discrete points disposed along a diameter and separated by 200 mm one from the other.

The fibre was made by the vacuum plating technique within a tube of quartz glass.

The incorporation of germanium as the dopant in the $SiO_2$ matrix in the fibre core was obtained during the synthesis step.

The incorporation of erbium, alumina, and lanthanum into the fibre core was obtained by the so-called "solution doping" technique, in which a water solution of the dopant chlorides is brought into contact with the synthesis material of the fibre core, while this material is in the particulate state, before consolidation of the preform.

More details on the solution doping technique can be found for example in U.S. Pat. No. 5,282,079, which is herein incorporated by reference.

The first active fibre 12 was approximately 8 m long. The second active fibre 17 was about 11 m long.

c) Transmission Experiment

The described configuration is particularly adapted for, and gives satisfactory results in transmissions over distances on the order of 500 km, at a high transmission speed, for example 2.5 Gbit/s (thereby obtaining, with four multiplexed wavelengths, a transmission capability corresponding to 10 Gbit/s on a single wavelength), making use of four line amplifiers, one booster and one pre-amplifier.

With the above described configuration a high-speed transmission on several channels was achieved.

The signals used for the transmission experiment on several channels were respectively generated by a laser DFB at 1534 nm, modulated with an external modulator at 2.5 Gbit/s; a continuous-emission laser DFB at 1556 nm, produced by ANRITSU; a continuous-emission laser DFB at 1550 nm, produced by ANRITSU; a continuous-emission laser ECL of a variable wavelength preselected at 1544 nm, model HP81678A, produced by HEWLETT PACKARD COMPANY, Rockwell, Md. (U.S.A.).

The external modulator employed for the modulation at 2.5 Gbit/s consisted of a modulator of the Mach-Zender type in $LiNbO_3$, produced by the assignee of this application, model MZM 15301.

In the experiment carried out each of the filters 11 was provided with a respective tuning device, while the spectrum analyzing device was applied in succession to the outlets of the line amplifiers, at points shown in FIG. 1, as described in the following.

The overall optical power at the pre-amplifier 9 entrance was −20 dBm.

d) Selection of the Channel

In order to send the respective channel to each receiver 8a–8d, the splitter 10 shares out or splits the whole optical signal received on the respective outlets and each filter 11 lets only the signal of interest pass on the respective output fibre 21a, 21b, 21c, 21d, carrying out an optical filtering in a narrow band about the respective signal-carrying wavelength.

To this end, filters 11 preferably consist each of a filter of the Fabry-Perot type, for example of the type previously specified, provided with a tuning device 22 of the piezoelectric type. Alternatively, for making filters 11, also acousto-optical filters can be used as well as tunable gratings or thin-film interference filters tunable by means of tuning devices of the electromechanical type.

In all the above cases, and possibly in other unlisted similar cases, commandable actuator devices are at all events present which act on the filter, and through which the selection of a desired passband is operated.

While for the sake of simplicity the tuning device 22 has been shown only in combination with one of the filters 11. In the described experiment each filter 11 was provided with a respective tuning device.

A Fabry-Perot filter with a tuning device of the piezoelectric type, adapted for the above stated use is for example model FFP-TF, commercialized by MICRON-OPTICS, INC., 2801 Buford Hwy. Suite 140, Atlanta, Ga., U.S.A., or model MF 200 commercialized by QUEENSGATE INSTRUMENTS Ltd., Silkwood Park, Ascot, Berkshire SL5 7PW, GB.

Figure 3:
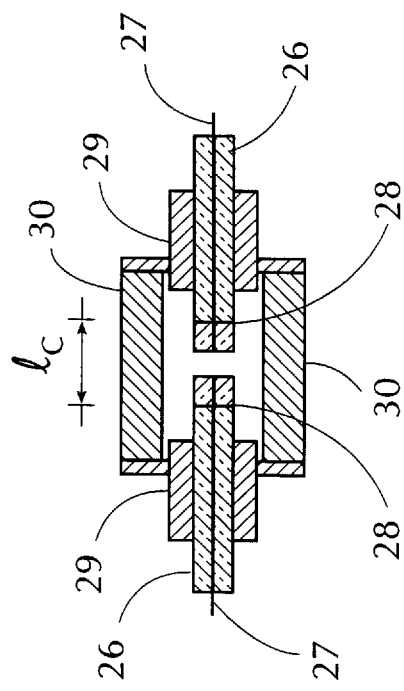
FIG. 3 is a diagrammatic section of a Fabry-Perot filter.
Figure 4:
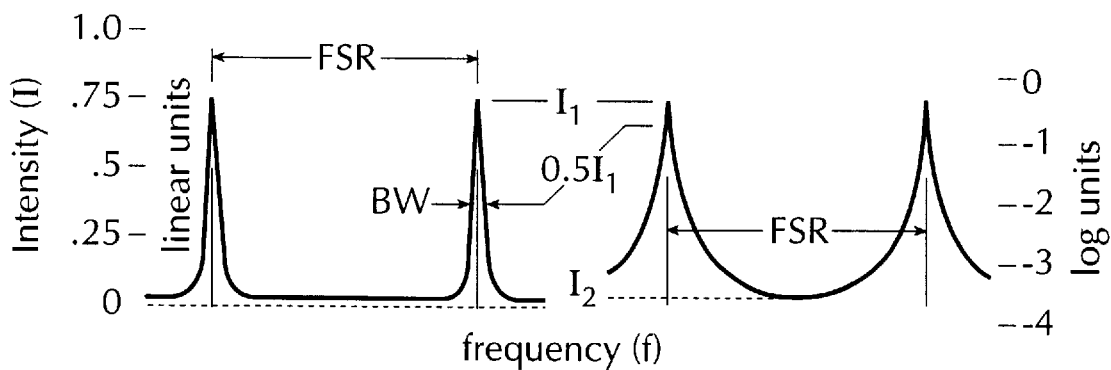
FIG. 4 shows the graph of the theoretical response curve of a Fabry-Perot filter (optical through-intensity, on a linear and logarithmic scale, depending on frequency)

A diagram showing the structure of the Fabry-Perot filter is reproduced, just as an indication, in FIG. 3 and its response spectrum is represented in FIG. 4, in a linear diagram on the left and a logarithmic diagram on the right.

As shown in FIG. 3, the filter comprises respective ferrules 26, into which the ends of respective optical fibres 27 are housed. Reflective elements 28 facing each other form a cavity the width of which determines the filter through wavelengths.

Given the periodic nature of the phenomenon, the filter has several through-wavelengths separated from each other, in the frequency domain, by regular intervals the width of which is usually indicated as Free Spectral Range, FSR, as shown in the graph in FIG. 4.

Ferrules 26 are in turn housed within respective supports 29 and the piezoelectric actuators 30 are seated between the opposite supports 29.

A voltage applied to the piezoelectric actuators 30 modifies the size of same and thus modifies the cavity length $l_c$ between the reflective elements, thereby enabling tuning of the filter in the desired wavelength band, in response to an appropriate command signal applied thereto by an associated tuning device.

An ideal Fabry-Perot filter has a general equation of the transmission coefficient depending on the wavelength $\lambda$ (Airy function):

$$t(\lambda) = \frac{T^2}{(1-R)^2} \left[ 1 + \left( \frac{2NR}{\pi} \right) \sin(n\pi)^2 \right]^{-1}$$

wherein:

n is the travel difference between the interfering beams, expressed in wavelength units, R is the reflection intensity coefficient, NR is the reflection "finess" of the cavity, defined as:

$NR = FSR/\delta$ wherein $\delta$ is the bandwidth at half power (transmission point at 3 dB) of the passband, and $FSR = \lambda/n$.

As shown in FIG. 4, the Airy function is a periodic function with transmission peaks at consecutive whole values of n.

Preliminarily, each filter is characterized in order to identify the preliminary parameters, specific for the filter in use, that will be employed for the tuning operations described in the following, and in particular the voltage gradient G which is to be applied in order to obtain a given variation speed in the transmitted wavelength (for example 0.2 nm every 0.5 ms).

Since the process of the invention is capable of tuning a filter and keeping it tuned on a particular carrier, it is first of all described hereinafter the tuning device and subsequently the operating method.

d1) Tuning Device

The tuning device 22 is adapted to compensate for slips of the Fabry-Perot filter, of thermal nature for example, and hysteresis of the related actuators, and to keep it "hooked" at the wavelength of the respective signal.

Figure 5:
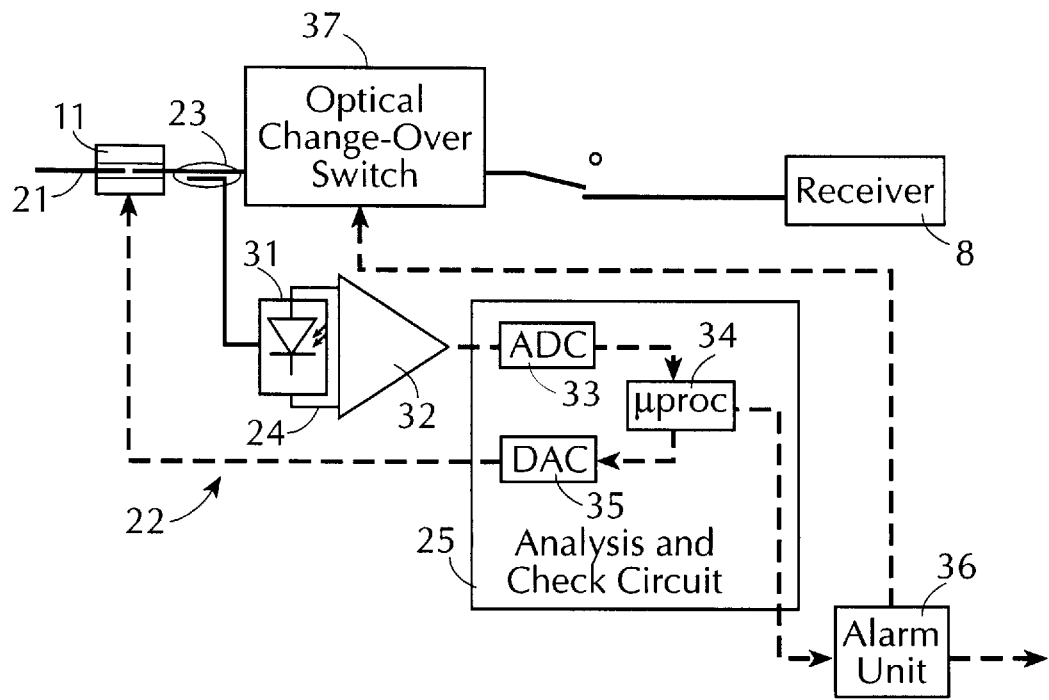
FIG. 5 shows the diagram of the tuning circuit associated with the receiver of FIG. 1.

The diagram of the tuning device is detailed in FIG. 5, in which connections of the optical type are shown in solid line and electric connections in dotted line.

The tuning device 22 comprises an optical coupler 23 located downstream of filter 11, adapted to draw or extract a portion of the optical signal from the fibre 21 directed to the respective receiver, a detector 24 adapted to convert the received optical signal to an electronic form and an analysis and check circuit 25 adapted to generate the electric piloting signal of the respective filter 11.

In more detail, the detector 24 comprises a photodiode 31 connected to an electronic amplifier 32. The output of the amplifier 32 is sent to an analog/digital converter 33, and from the latter to a microprocessor 34. In turn, the microprocessor output is sent to a digital/analog converter 35, the signal of which pilots the filter 11.

The optical coupler 23 preferably is a fused-fibre coupler 95/5, adapted to draw 5% of the optical power. An appropriate coupler is model SWBC2PR3PP210, produced by E-TEX DYNAMICS INC., 1885 Lundy Ave, San Jose, Calif. (U.S.A.).

The photodiode 31 is a photodiode PIN, in InGaAs; for example, model ETX75 FJ SLR, available from EPITAXX OPTOELECTRONICS DEVICES, 7 Graphics Drive, West Trenton, N.J., U.S.A., or model FD100F, available from FERMIONICS OPTOTECHNOLOGY, 4555 Runway Street, Simi Valley, Calif., U.S.A.

The electronic amplifier 32 preferably consists of an amplifier having a very small offset, for example model LTC 1051 available from LINEAR TECHNOLOGY CORPORATION, 1630 McCarthy Blvd, Milpitas, Calif., U.S.A.

The analog/digital converter 33 is a 12-bit converter, commercialized by said LINEAR TECHNOLOGY.

The digital/analog converter 35 is a 12-bit converter, commercialized by MAXIM INTEGRATED PRODUCT, 21C Horseshoe Park, Pangbourne Reading, UK.

The microprocessor 34 is a 8-bit microprocessor model ST90E40, marketed by SGS THOMSON (viale Milanofiori, Strada 4, Palazzo A4, Assago, MI, IT).

The microprocessor adapted for use in the present invention is a device comprising processing units, memory registers and the like, known per se and commercially available, and therefore not further described.

Conveniently, the microprocessor 34 is provided with another output sent to a system alarm unit 36 capable of supplying alarm signals, for example relating to the carrier hooking and the presence of optical power on the detector 24, and transmitting a check signal to an optical change-over switch 37 adapted to open the optical circuit to the receiver 8, disconnecting it from reception, if hooking to the carrier of the channel related thereto did not occur within a predetermined time, 40 ms for example, and keeping said circuit disconnected over the time necessary to restore said hooking.

An appropriate optical change-over switch is for example model SW11Z4-00NC, available from JDS FITEL INC., 570 Hest on Drive, Nepean, Ontario, CA (U.S.A.).

d2) Tuning Method

The above described tuning device operates through a procedure involving the following steps: initial setting of the filter to identify the wavelength range in which all searched carriers are located, division of this range to identify the wavelength range in which each carrier is located, scanning of the range in which a single carrier is to be searched, recognition of the searched carrier and finally, hooking and hooking-holding to keep the filter centered on the carrier itself.

The present invention is particularly useful in the case in which the relation between voltage and central wavelength of the filter passband suffers from hysteresis and memory phenomena, or similar phenomena affecting the stability in time of the through-wavelength or the repeatability of same, as for example in the case herein described of filters having piezoelectric actuators.

According to the invention, it has been noted that in order to compensate for said hysteresis, memory and similar phenomena, it is particularly convenient to activate the piezoelectric actuators a certain number of times before making the desired correlation between the piloting voltage and the corresponding wavelength, always applying the same voltage gradient starting from the same initial voltage.

In the following the voltage gradient denoted by G has been used, which has been determined for each filter type or model during the preliminary setting step.

Said gradient is defined as the voltage ramp that, applied to the filter, generates a predetermined variation in time at the central wavelength of the filter passband (for example 0.2 nm every 0.5 ms) under environmental laboratory conditions.

For example, such a ramp can consist of discrete increments of 0.02 mV every 0.05 ms.

In a preferred embodiment, in the case of four spatial carriers with intervals included between 4 and 8 nm described by way of example, the system can operate in the following manner.

d2.1) Setting

On turning the system on, the microprocessor initially carries out setting of the filter, with reference to the spontaneous emission present in the optical signal following the action of the amplifying fibres of the amplifiers interposed along the line. This spontaneous emission is characterized by a sure and stable spectral reference, represented by the wavelength corresponding to its peak.

Figure 6:
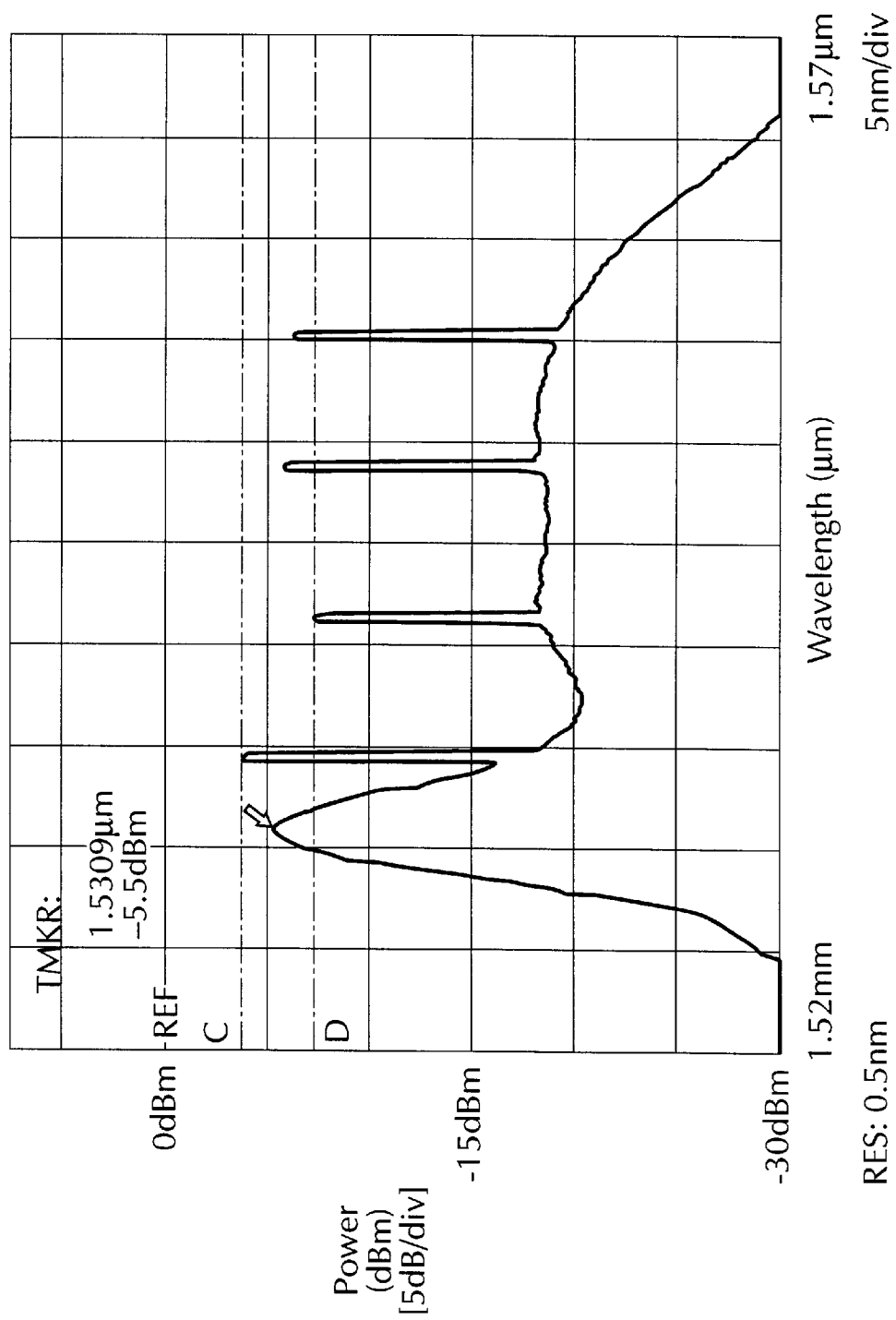
FIG. 6 shows a signal spectrum detected at the preamplifier exit in the system of FIG. 1 (in which the first carrier does not overlie the spontaneous-emission peak)

The spontaneous-emission profile overlapped with the peaks of the transmitted signals is shown in FIG. 6 representing the optical spectrum detected at the pre-amplifier 9 outlet for one of the branches separated by the splitter 10.

For the described procedure, the filter is selected with a free spectral range (FSR, measured by application of a voltage ramp of gradient G) which is greater than or equal to the width of the spontaneous-emission band (that is the wavelength band in which there is a clearly distinguishable spontaneous emission, for example 3 dB higher than the background noise).

In the experiments relating to the described example, filters having a (nominal) FSR of 45 and 60 nm were used.

Figure 7:
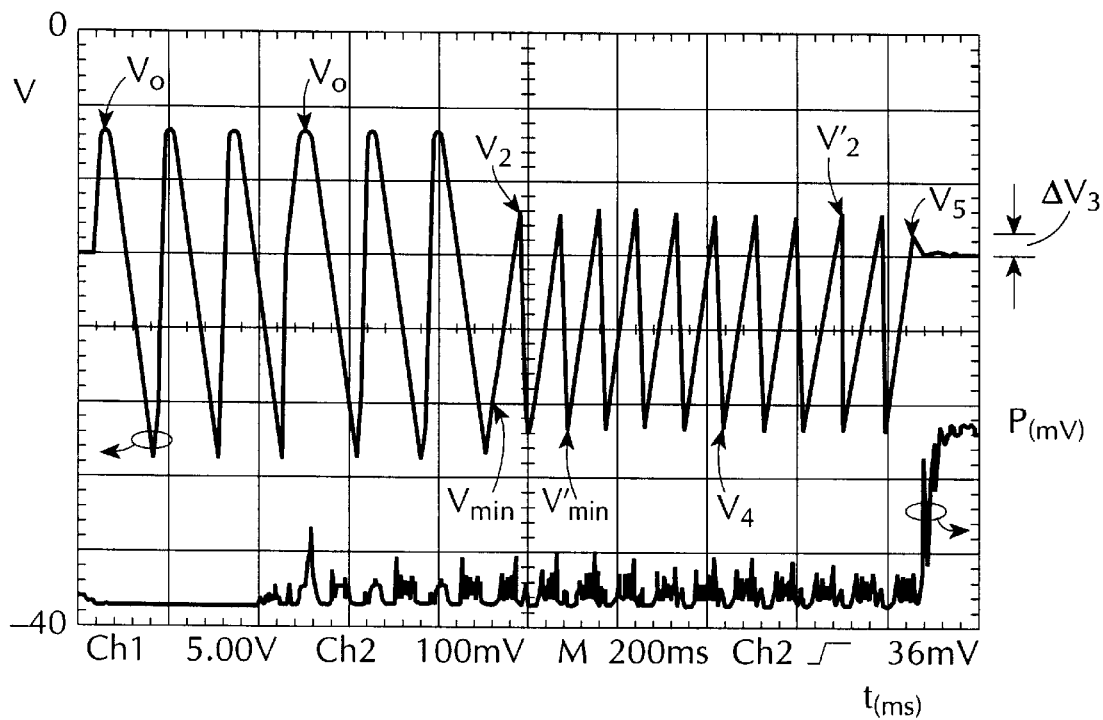
FIG. 7 is a diagram showing the course in time of the voltages applied to the filter and the optical power received during the channel search.
Figure 8:
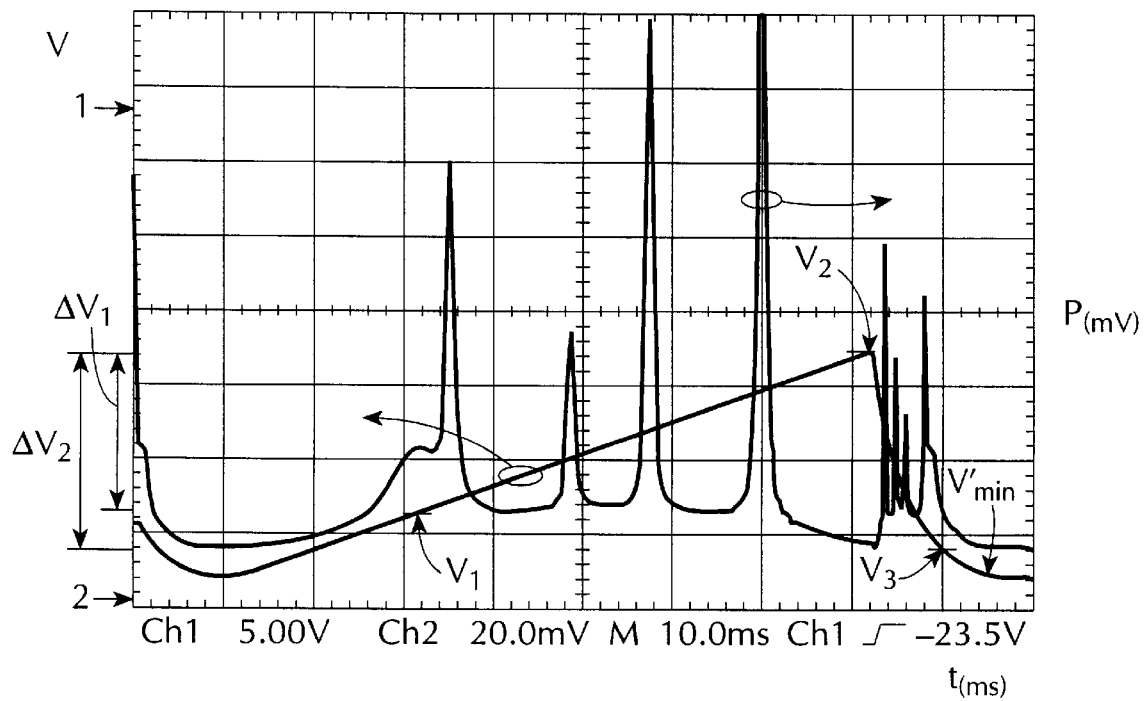
FIG. 8 shows an enlarged portion of the diagram in FIG. 7.

To carry out setting, as shown in FIG. 7, the microprocessor 34 commands the application of a first voltage $V_0$ to the filter, which is intermediate between the minimum and maximum piloting voltage of the filter (usually such minimum and maximum voltages are 0 and 45 V, respectively).

In addition, the filter is selected in such a manner that, on varying of the voltage (with a gradient G) between the minimum and maximum values, an excursion of the intermediate wavelength of the passband equals at least 3 FSR.

If in the subsequent step decreasing voltages are used, said voltage $V_0$ is higher than the average voltage (22 V) by a given value calculated by adding to the average voltage value such a voltage increment that the scanned range will be centered within the filter work range.

For example, this increment can be half the voltage variation corresponding to the excursion of the intermediate wavelength of the passband equal to a whole FSR, multiplied by a factor greater than 1 (1.5 for example).

The choice of using increasing or decreasing voltages during the range scanning step is done preliminarily. Scanning with voltage ramps having opposite gradients relative to those shown in the example described in the following are deemed to give similar results.

In the following of the present description reference is made to the case in which decreasing wavelengths correspond to decreasing voltages. The opposite case can be dealt with in the same manner by suitably exchanging "decreasing" with "increasing".

d2.1i.

Starting from voltage $V_0$ the microprocessor carries out a scanning of the optical band, causing decreasing, with gradient G, of the voltage applied to the actuators until a minimum given value, for example identified as lower than voltage $V_0$ by a value equal to the voltage variation value corresponding to one FSR multiplied by the same factor as previously pointed out, which is higher than 1.

During this voltage excursion, the voltage applied to the filter is registered, as well as the corresponding optical power received by the detector 24 at each predetermined time interval (0.5 ms, for example) and the power value of each measurement is compared with the preceding one, until an absolute minimum of optical power received $P_{min}$ is found along with the voltage $V_{min}$ corresponding thereto.

If an optical power minimum cannot be identified, for example in the absence of signals and spontaneous emission, as shown in the first three voltage ramps in FIG. 7, after scanning of the whole range the system goes back to value $V_0$, by applying a voltage step, and the cycle is repeated.

Figure 13:
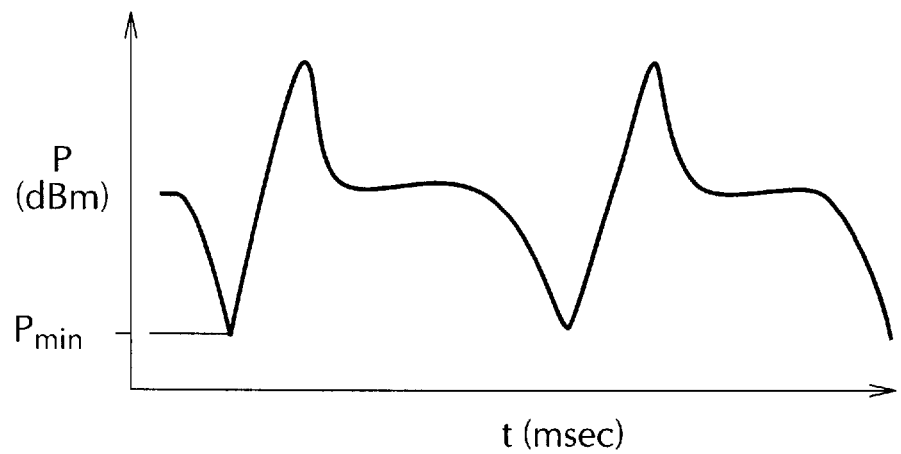
FIG. 13 is a qualitative diagram of the optical power spectrum passing through the filter, on varying of its piloting voltage.

In the presence of a spontaneous emission (and signals), given the periodicity of the filter passband, the profile of the received power on varying of the position of the reflective elements in the filter (that is the piloting voltage of the piezoelectric actuators, although the correlation between voltage and wavelength has been found non-linear as it is subjected to hysteresis and thermal slip phenomena) is repeated as qualitatively shown in FIG. 13. In fact, when the excursion of the movable reflecting elements in the filter corresponds to a multiple integer of FSR, a new transmissive window comes into register with the emission band of the fibre, so that the detector 24 registers the spontaneous-emission spectrum again (and the carriers present therein, if any).

As shown in FIG. 13, said minimum power value $P_{min}$ is close to the region included between two spontaneous-emission figures.

When a minimum value of optical power has been identified, scanning of the whole range is repeated a number of times (three times in the example shown in FIG. 7), still applying the voltage gradient G, until said minimum substantially occurs at the same voltage value, which is denoted as $V_{min}$, for example within an interval of ±1 V.

d2.1.ii. When a stable value of $V_{min}$ has been identified, within the above interval, the microprocessor commands the application of voltage $V_{min}$ to the filter, which stably corresponds to the detected value $P_{min}$ and, starting from this voltage value, the application of successively increasing voltages, with the predetermined mean gradient G.

During this voltage ramp, the voltage value $V_1$ is registered, which value corresponds to the maximum of the spontaneous emission, or the peak of the first carrier encountered (at 1534/1536 nm, for example), if the maximum of the spontaneous emission is not detected. The spontaneous-emission maximum is the main spectral reference searched for with the present procedure. However, if this maximum is overlaid by the first carrier, sometimes it could be not detected. In this case however the first carrier of known wavelength is present and it is taken as the spectral reference.

The distinction between the spontaneous-emission maximum and the peak corresponding to a carrier is carried out by a recognition procedure, active during the whole cycle and described in the following.

The spontaneous-mission maximum is identified as such at a sampling, if it is a maximum value that is not recognized as corresponding to a carrier, based on said recognition procedure, and if the value of the measured power keeps lower than said maximum value over a predetermined number of successive samplings (9 for example). If no spontaneous-emission maximum is identified, the first carrier encountered is taken as the carrier overlying the spontaneous-emission maximum, that is, in the present example, the carrier at 1534/1536 nm.

The voltage ramp is stopped at a value $V_2$, after an increment $\Delta V_1$, with respect to voltages corresponding to the spontaneous-emission maximum (or the first carrier), enabling the region of the upper extreme of the spontaneous emission (1570 nm) to be reached without however reaching the spectrum corresponding to the next transmissive window of the filter. Said value $\Delta V_1$ is different depending on whether $V_1$ was identified as corresponding to the spontaneous-emission maximum or the first carrier. This difference is equal to the required voltage increment, applied with gradient G, to move the transmitted wavelength from the value corresponding to the spontaneous-emission peak to the value corresponding to the first carrier.

By way of example, if V1 was identified as the spontaneous-emission peak, the overall voltage increment $\Delta V_1$, in the present example, is about 10 V.

Since in the subsequent steps the starting point for applying the voltage gradient is different (see the above considerations concerning the hysteresis and memory phenomena of piezoelectric actuators), different wavelength values are obtained, the voltage increment applied with gradient G with respect to the voltage corresponding to the spontaneous-emission maximum or the first carrier being equal. The above must be taken into account in determining the values of $\Delta V_1$ and in selecting the width of a filter type having an appropriate FSR width, so as to cause the arrival point to be always beyond the last carrier provided in the operating use but before the subsequent spontaneous-emission spectrum which is encountered, due to the filter periodicity.

d2.1.iii. A quick (stepped) voltage decreasing $\Delta V_2$, of predetermined value, is applied starting from value $V_2$, this decreasing preferentially corresponding to approximately 1.5 the preceding increment $\Delta V_1$. This decreasing also depends on gradient G according to which the filter commanding voltage is applied.

The applied voltage decreasing value $\Delta V_2$ is selected in order to position the filter such that the reached point $V_4$ corresponds to a wavelength close to the minimum value $P_{min}$.

In the absence of hysteresis phenomena in the piezoelectric actuators of the filter, in the described example, step iii. would lead to a wavelength lower than that corresponding to point $P_{min}$. It has been however experimentally contemplated that this decreasing, in the described example, during the first cycles in which it is applied does not enable said minimum point of the spontaneous emission to be reached and that sometimes does not even enable the spontaneous-emission peak to be overcome.

d2.1.iv. Starting from point $V_4$ the search of the minimum is repeated, by decreasing the applied voltage, with the same gradient G, until a power threshold value is reached, consisting for example of the previously measured $P_{min}$ value increased by 3 dB. The voltage corresponding to this threshold is registered as the new $V_{min}$ value.

d2.1.v. The preceding steps ii iii iv are repeated a predetermined number of times, five times for example. During these cycles a stabilization of the $V_{min}$, $V_2$ and $\Delta V_2$ values successively found progressively occurs, due to the progressive reduction of the effects resulting from the memory phenomena of the piezoelectric materials, thanks to the repeated application of a periodic course of the guide voltage.

The repetition number is selected such that the spontaneous-emission peak (or the first carrier, or, more generally, a known and preselected reference in the spectrum) occurs at a substantially constant voltage, wherein accuracy is equal to the voltage variation corresponding to a sampling interval (200 mV, for example).

d2.1.vi. Subsequently, other cycles (5 for example) are carried out and they differ from the preceding ones in that, after the application of the voltage increment $\Delta V_2$, the search for the minimum according to the procedure described at point i. is not carried out, but the voltage increase is directly executed, with gradient G. This enables the detection of the maximum of the spontaneous-emission peak or the first carrier to be carried out through the application of voltage cycles similar to each other.

d2.1.vii. Identification of the Carrier

The above cycles (point d2.1.vi) being completed, the microprocessor registers the voltage value corresponding to the spontaneous-emission peak (or the first carrier) and those corresponding to the extremes of the intervals within which the different carriers are.

These intervals are defined so as to contain the desired carrier alone (although in the presence of tolerances and possible residual hysteresis and shift phenomena that cannot be compesated for).

d2.1.viii. Carrier Hooking

Once the carrier is identified, as described in the following (point d2.3) and the power value corresponding to its registered maximum, the microprocessor applies a negative voltage step $\Delta V_3$ of a value determined experimentally, typically of 1–2 V, capable of reducing or eliminating the inertia in the filter motion.

Then a decreasing voltage is applied, with a gradient of reduced (halved, for example) value, with respect to gradient G hitherto used, and the optical power values corresponding to the applied voltage values are detected at each predetermined time interval (consisting for example of 0.5 ms).

After overcoming in succession first a voltage value corresponding to a power equal to 90% of the maximum value detected on recognition of the carrier and afterwards a voltage value equal to 50% of the maximum value itself, scanning is stopped and repeated in the opposite way (that is, for example, with an increasing voltage gradient if previously a decreasing voltage gradient was used), with a gradient of a further reduced value by a given amount, for example again halved.

The scanning procedure is repeated until a voltage gradient is applied which enables the voltage increment at each step to correspond to a sufficiently small wavelength variation, of about 0.02 nm for example.

Then two other scannings are carried out with this gradient and the voltage corresponding to the intermediate value between the two last-measured values corresponding to 50% of the maximum value is identified as the voltage corresponding to the carrier position.

d2.1.ix. Carrier Selection

The detected reference values (minimum-power voltage and voltage corresponding to the spontaneous-emission peak, first carrier or other known reference) constitute a new setting reference for the filter, based on which the microprocessor can modify the setting relation first used for calculating the voltage intervals within which the carriers are to be searched out (and in particular the one corresponding to the related filter).

Cycles pointed out at point d2.1.vi being completed, the microprocessor carries out the carrier recognition by adopting the method hereinafter indicated (point d2.2). If this recognition takes place within the voltage interval corresponding to the searched carrier (point d2.1.vii), the hooking procedure is activated (point d2.1.viii) and the hooking-holding procedure is activated (point d2.3).

d2.2. Carrier Recognition

Power measurements of the optical signal downstream of the filter are carried out at each predetermined time interval (0.5 ms for example).

Measurements thus made fill a cyclic memory, a 15-value memory for example. On storing a new value, the value which has been stored for the longest period of time is discarded.

Figure 9:
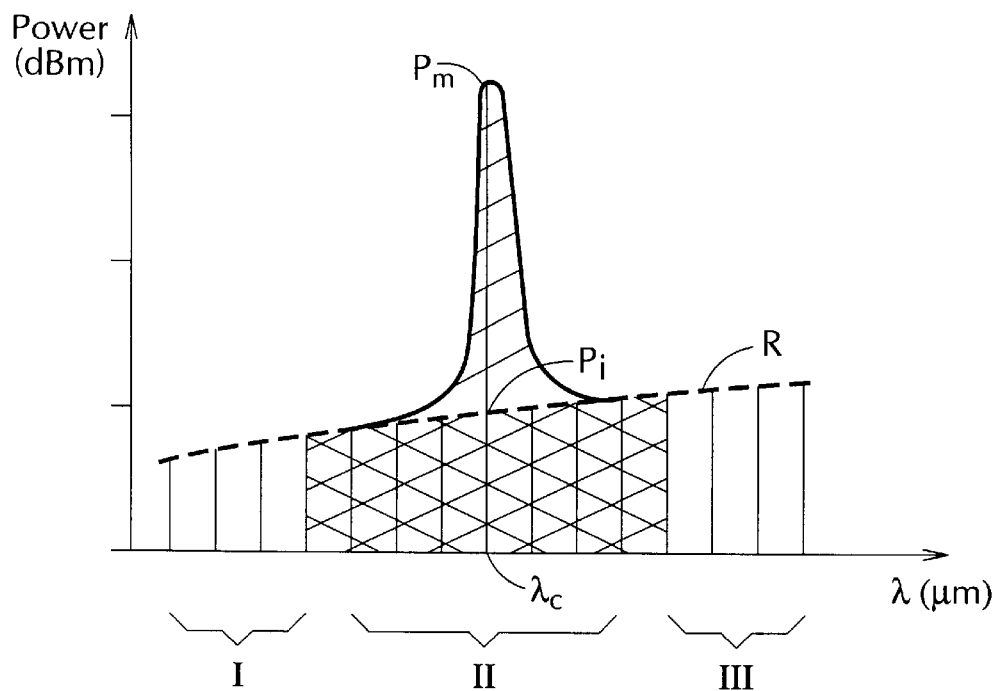
FIG. 9 is a qualitative diagram of the optical power measurements carried out during the carrier-search and recognition procedure, depending on the wavelength, at the carrier of a channel.

After every detection, measurements in the memory are divided into three groups, as diagrammatically shown in FIG. 9 and sequentially denoted by I, II, III, wherein groups I and III, called end groups, contain the same number of measurements, four for example, and the intermediate group II contains the intermediate measurements executed, preferably odd in number, seven for example.

By discarding the measurements of the intermediate group, the measurements of the end groups I and III are interpolated with an appropriate algorithm and the interpolating curve is extended also in the intermediate region, the measurements of which have been discarded.

Figure 10:
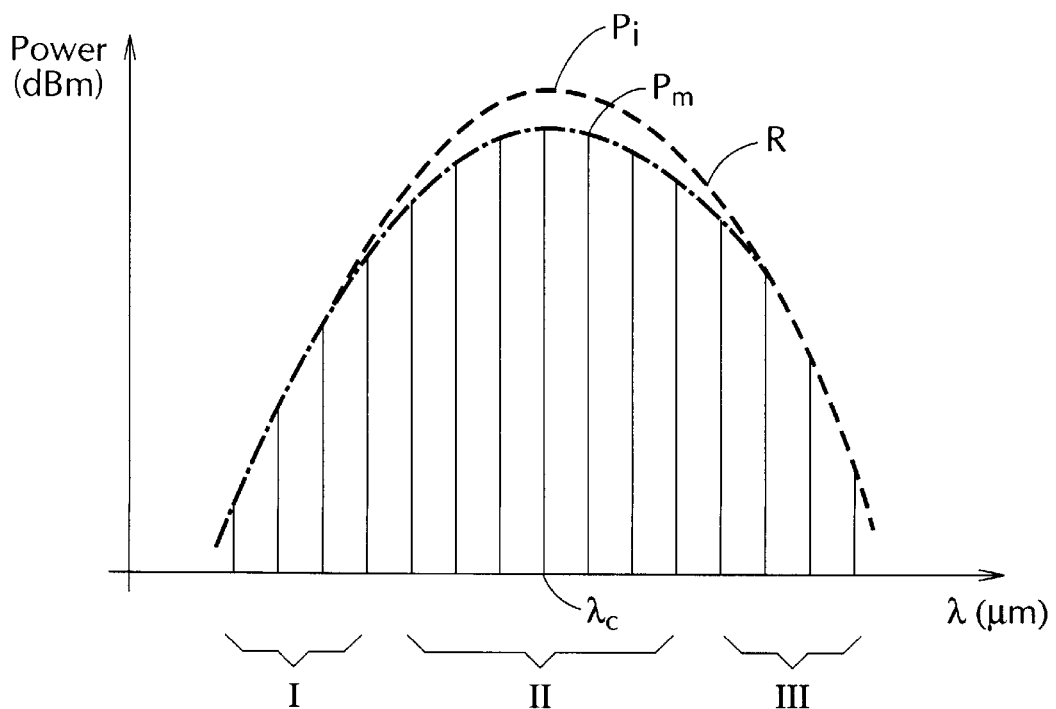
FIG. 10 shows a diagram as in FIG. 9, at a local variation of optical power that does not correspond to the carrier of a channel.

This interpolation gives origin to a curve R, shown in phantom in FIG. 10.

Based on this interpolation curve, the microprocessor checks whether the measurement carried out at the central wavelength $\lambda_c$ in the intermediate subgroup II has the measured optical power $P_m$ greater than the optical power $P_i$ calculated through the interpolation function R at the same wavelength, by a predetermined factor, 3 for example. If this condition is complied with, the wavelength $\lambda_c$ is identified as the wavelength of the optical carrier.

The condition corresponding to the desired ratio is, by way of example, graphically represented in FIG. 9, in which the ratio $P_m/P_i$ meets the indicated prescription.

d2.3. Hooking-holding

Two values of optical threshold power are calculated, respectively referred to as "attention threshold" $P_A$ and "release threshold" $P_S$. These values are calculated for example as 80% and 25% respectively of the maximum power value of the carrier, detected during the hooking step.

The carrier of the desired channel being hooked, the microprocessor 34 by a stepped application commands the required voltage variation for positioning of the passband of filter 11 at the value detected as the central value of the concerned carrier.

Starting from this position, the passband of the filter is shifted at regular intervals, by a step of a given value (corresponding for example to 0.02 nm, every n seconds) in one direction, by applying a corresponding (positive or negative) voltage increment to the filter actuators.

At each step, several samplings (8 for example) of the received power are executed in a quick succession (one every 0.5 ms, for example) and the average of the detected values $(P_B)$ is calculated.

If the average is higher than the previously measured average value, another step is carried out going in the same direction, the new samplings being executed and the new average $(P_B)$ being calculated.

For the first step, value $(P_B)$ is compared with the maximum carrier value registered during the hooking step.

If the average $(P_B)$ is lower than the preceding one, the shifting direction is reversed, two steps are carried out and samplings of the power are executed at the second step.

If the measured power average remains higher than $(P_A)$, after a predetermined period of time (16 s, for example), the number of samplings executed at each step is doubled, until a predetermined maximum number is reached, 1024 for example, which corresponds, with an interval of 0.5 ms between each measurement, to an overall sampling time of 512 ms.

Conveniently, if the average power measured at one step goes down under said attention threshold $(P_A)$, the number of samplings executed at each step is reduced (to 8, for example), in order to allow a quicker pursuit of the maximum, although under conditions of greater noise in the system.

The above described hooking procedure enables the system operation to be followed continuously, compensating for possible slips, both of the signal and filter, due for example to temperature ranges, vibrations, disturbance or other.

If the measured instantaneous power goes down below $(P_B)$ and stays to this value over a certain period of time (40 ms, for example), the filter "is released" and it is necessary to start again from the Setting procedure (see point d2.1).

Conveniently, values $P_S$ and $P_A$ can be periodically updated, using a long-period average value determined based on the detected values $P_B$, so as to conform the procedure to the variations in time of the system performance as a whole.

e.) Optical-spectrum Analysis and Determination of the Signal/noise Ratio

A device according to the present invention is conveniently applied to the analysis of the optical spectrum as well, in order to identify the carriers actually present and determine their signal/noise ratio along the line.

Figure 11:
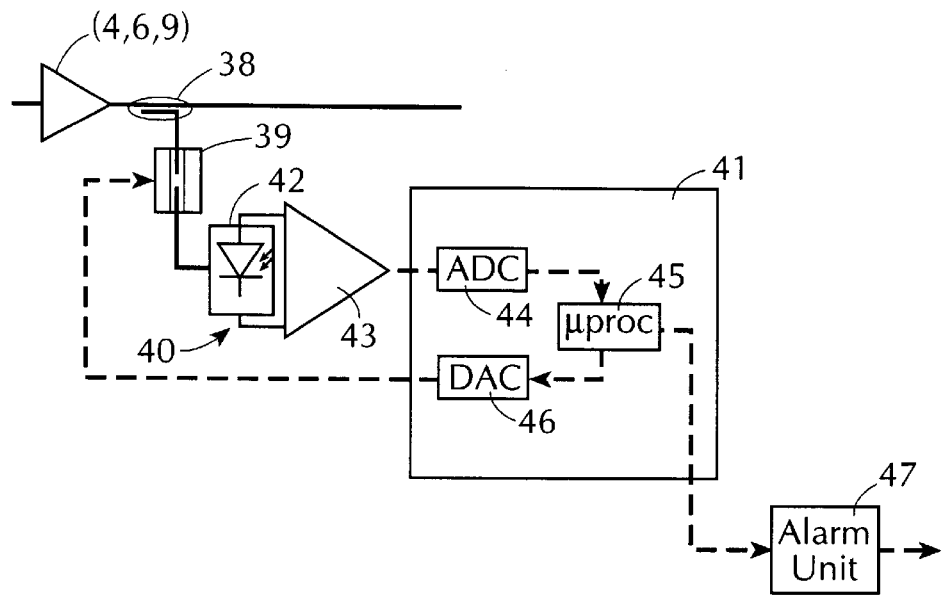
FIG. 11 shows the diagram of the circuit for analyzing the signal/noise ratio at the amplifier exit.

For the purpose, as shown in FIG. 1 and, in more detail, in FIG. 11, in which connections of the optical type are shown in solid line and electric connections are shown in dotted line, an optical coupler 38 having the same features as coupler 23 previously described is located at the outlet of an amplifier, or each amplifier, or a pre-amplifier 4, 6, 9.

Through the coupler the signal fraction drawn is sent to a filter 39, and from the filter to an optical detector 40, adapted to convert the received optical signal to an electronic form, and an analysis and check circuit 41, adapted to generate the electric piloting signal of filter 39.

In greater detail, the detector 40 comprises a photodiode 42, connected to an electronic amplifier 43. The amplifier 43 output is sent to an analog/digital converter 44, and from the latter to a microprocessor 45. In turn, the microprocessor output is sent to a digital/analog converter 46, the signal of which pilots the filter 39 through the digital/analog converter 46.

Conveniently, the microprocessor 45 is provided with another output sent to a system alarm unit 47, capable of providing the desired alarm signals, in the same manner as described with reference to filters 11.

The components used for the optical spectrum analysis can be the same as previously used for tuning of filter 11.

The described device operates as follows.

The microprocessor 45 commands the execution of a setting operation and, after identification of the region where the carriers are, recognition of the carriers as previously described is carried out. For determining the signal/noise ratio, for the measurement group which has been recognized as corresponding to the carrier of the searched channel, the microprocessor calculates the interpolation curve S (by extending it through the subgroup II) of the measurements of the end subgroups I and III and calculates the value of the interpolation function at the intermediate point of Group II.

Conveniently, these operations are carried out with steps corresponding to a 0.2 nm wavelength, at intervals of 0.5 ms.

For determining the signal/noise ratio, the microprocessor establishes the ratio between the signal power value optimized according to the procedure at point d.2.3 and the calculated value of the interpolation function.

This ratio constitutes the searched signal/noise ratio for the channel relating to the considered carrier and can be used by the microprocessor 45 itself or the alarm unit 47, or another apparatus connected thereto, to carry out system checks and the like.

The procedure can be repeated for each of the transmitted channels by tuning the filter in succession on each of them, then drawing the information concerning operation of the whole system, continuously during operation of same.

Figure 12:
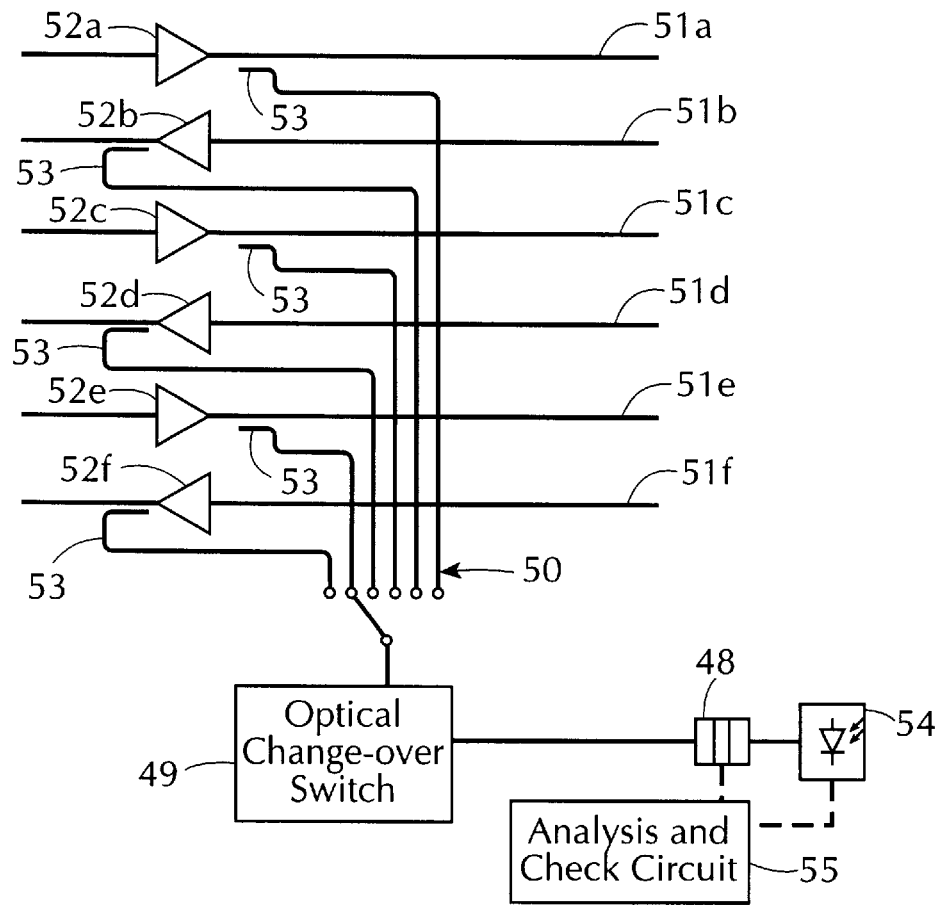
FIG. 12 is a diagram of the spectral analyzing device on several optical lines.

In another embodiment, shown in FIG. 12, a single filter 48 can be associated, through an optical change-over switch 49 adapted to be selectively connected to one of fibres 50, with several optical lines 51a, 51b, 51c, 51d, 51e, 51f and so on, for example at the respective optical amplifiers 52a–f, from the respective outlets of which a signal fraction (5% of the optical power, for example) is extracted, through the respective couplers 53. The filter 48, in the same manner as above described, is associated with a respective optical detector 54 and an analysis and check circuit 55.

In this manner, by a connection between the change over switch 49 and fibres 50, drivingly carried out for a particular line, or carried out sequentially based on a previously constituted procedure, all the optical lines 51 and the respective amplifiers can be checked by a single unit.

By the system of the invention it is possible to achieve hooking of the filter to the previously established carrier in a period of time of 100–300 ms.

In the case of four channels, that is four carriers at wavelengths spaced apart some nanometers (4–8 nm, for example) from each other, the above described search and hooking procedure has proved to be efficient in order to achieve hooking to the desired carrier for each of the transmitted channels alone, as a stable tuning-holding on the carrier itself.

When more than four channels are transmitted with the related carriers to a shorter distance, tuning and hooking may require closer tolerances for the localization of the search bands for each filter. To this end, the setting range and the search and fine-tuning bands can be conveniently defined by making use of other references at the known wavelength, in addition to the voltage value corresponding to the use of the spontaneous-emission peak or the signal peak, as above described.

It should be noted that, in the absence of the searched carrier, for example when the related channel is turned off, the procedure is maintained active until the related channel is activated again.

In one aspect, the method of the present invention concerns the recognition of optical signals through the analysis of the optical spectrum containing said signals, based on the profile of the spectrum itself.

In addition, the analysis of the optical spectrum enables particular features of the signal under examination to be determined, such as for example the signal/noise ratio.

In another aspect, the method according to the invention relates to the identification and filtering of optical carriers through the analysis of the optical spectrum containing said carriers and the recognition of the carriers based on the profile of the spectrum itself.

In a particular embodiment, in the method of searching and hooking the carriers in a multi-wavelength optical telecommunication system according to the present invention, it is provided that the tunable filter be repeatedly operated through its adjustment band, by applying, with a periodic course, a piloting voltage varying between identified and repeatedly updated extremes in connection with optical-power reference values known as stably corresponding to known wavelengths.

In a particular aspect of the invention, voltage is applied according to cycles becoming increasingly more similar to themselves in order to eliminate ambiguities caused by the hysteresis of the actuators used for operation and tuning of the filter. The piloting voltage values are identified and repeatedly updated in relation to recognition in the optical spectrum of known references, stably corresponding to precise wavelength values.

In a preferred case, convenient values of spectral references comprise the spontaneous-emission peak of erbium of the optical amplifiers present along the line and, possibly, one or more carriers known as such.

Based on said references, in addition to the initial setting relation of the filter, scanning of the voltage range is commanded with a variation law of the periodic voltage at constant gradients, until a voltage range is identified which stably corresponds to the predetermined wavelength range for the channel search.

Said voltage range is therefore divided into bands, within which each of said searched channels is provided to be located.

Within a selected band corresponding to the channel searched out by the specific filter, the carrier is identified by means of a recognition procedure consisting in comparing the features of an optical-power maximum value with the corresponding interpolated features based on the values measured at contiguous voltages.

Said procedure therefore, even in the presence of a filter subjected to slips and having high sensitivity to the stress speed of the related actuators, enables the search range of each carrier to be determined and the carrier itself to be identified.

In addition, the apparatus itself and the carried out measurements enable a continuous determination of the signal/noise ratio to be obtained for each of the concerned channels.

While the present invention has been described with reference to the emission features typical of a connection making use of optical amplifiers with a particular active fibre, being in the presence of different emission spectra and/or different signal distributions or features, or filters having particular response features, a person skilled in the art will be able to determine, based on the teachings of the present invention, the reference features and values of the signal and the scanning cycles of the optical band, based on which tuning of the specific system is accomplished.

In a more general form, the present invention applies to each system in which a response signal depends on an adjustment signal subjected to hysteresis or disturbance the amount of which cannot be predetermined, in which it is possible to identify at least two reference signals of known value, adapted to constitute the base for the range scanning.

Figure 14:
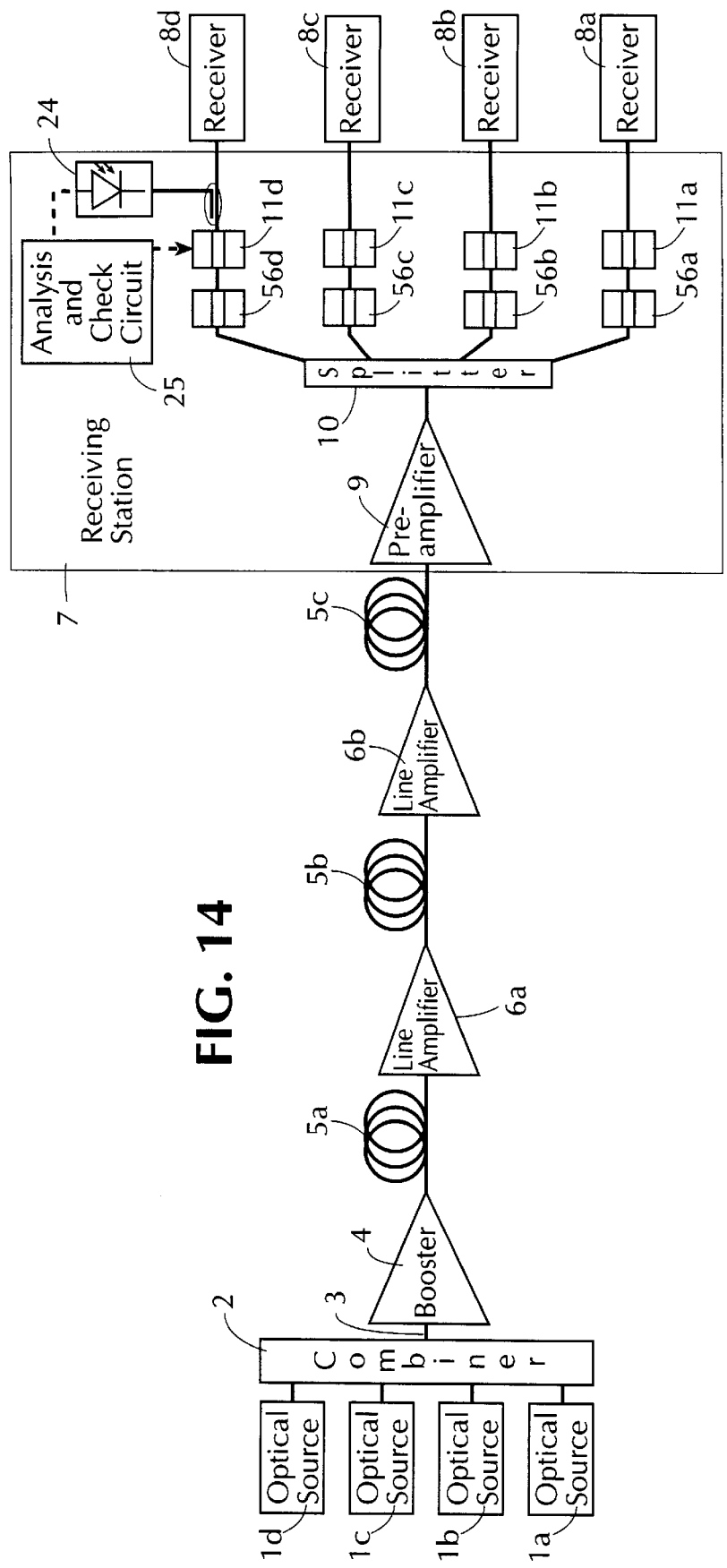
FIG. 14 is a diagram of a multiwavelength telecommunication system according to a further embodiment of the present invention.

In a further embodiment, as shown in FIG. 14, fixed filters 56a, 56b, 56c, 56d are located before each tunable bandpass filter 11a, 11b, 11c, 11d.

Such fixed filters 56a, 56b, 56c, 56d have a respective bandpass sufficiently broad, such as to include both the tolerance of the center wavelength of the relevant one of the emitters 1a, 1b, 1c, 1d, and the wavelength shift of the relevant tunable bandpass filter 11a, 11b, 11c, 11d, but at the same time sufficiently narrow to reduce the level of the other signals and of the spontaneous emission peak below a predetermined amount.

For example, a suitable pass band of the fixed filter (in a 4 wavelength system, as described) is about 2 nm. The predetermined amount by which the non-selected wavelengths are to be reduced is preferably at least 20 db, and, more preferably, at least 25 dB.

Suitable fixed filters are known and marketed, for example, by E-TEK.

Figure 15:
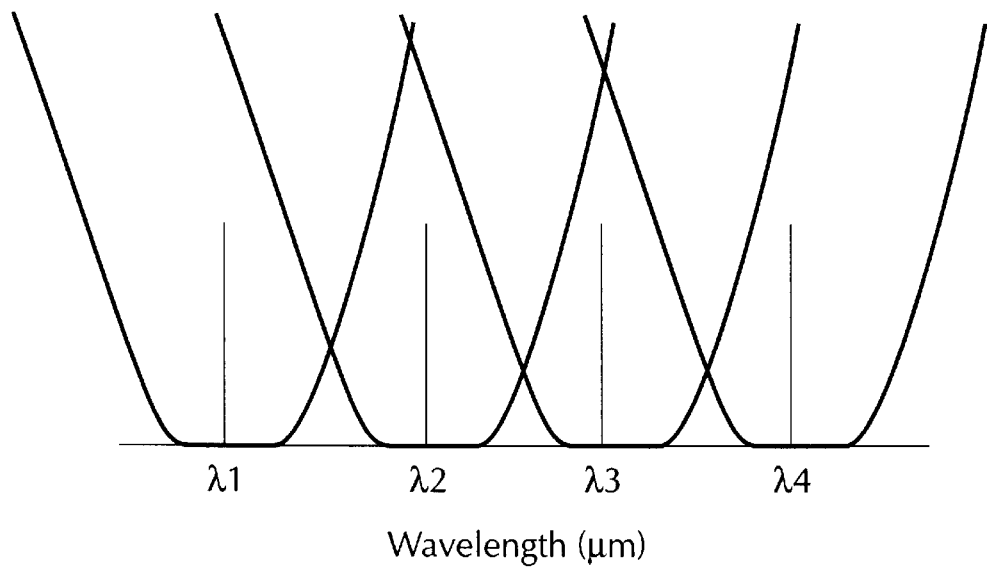
FIG. 15 is a graph of the passband of the fixed filters of FIG. 14.

The passband of the fixed filters is shown in FIG. 15.

As an alternative, a similar result can be obtained by using a wavelength selective demultiplexer to replace the splitter 10.

A low frequency tone (preferably between 30 and 200 Khz) is superimposed on the modulation of the optical-signal sources 1a, 1b, 1c, 1d. Preferably, each source has a tone with a frequency different from the others.

The tunable bandpass filters 11a, 11b, 11c, 11d are located between the relevant fixed filter and receiver 8.

Each tunable filter performs the search of the signal by searching a maximum of the optical power, according to the technique described above.

When the maximum of the optical power has been detected, the analysis and check circuit 25, associated to the detector 24, checks for the presence of the modulation tone associated with the relevant signal source. When such tone is present, the signal is recognized as the desired channel and the filter is maintained locked on the same signal, with the technique described before.

Being the tone missing, the unit 25 detects a failure in the transmitter or in the line, and, optionally, an alarm signal may be generated.

It must be observed that in an amplified system, the tones superimposed onto the signals cannot be used to distinguish the optical sources, because the presence of the tones causes a modulation of the spontaneous emission (i.e. in the whole transmisison band).

Because of the presence of the optical amplifiers along the line, in correspondence with a given signal at a given wavelength, all the tones of all the sources are detected, with an intensity which can even be greater than that of the given signal itself.

According to the invention, the tone is used to be informed of the presence of the searched signal in the already selected peak (the tone at a given frequency being absent in case the relevant optical source is off), but it is not used to select the signal itself.

In this embodiment of the invention, the selection of the signal search range in which the signal can be individually present is obtained by using the fixed filter before the tunable band-pass fitter, and the good signal/noise ratio thus obtained downstream the filters (at least 10 dB) allows to identify the signal when it is higher in intensity by a given amount over the spontaneous emission.

For example, in a system according to the invention the spontaneous emission (as detected downstream the filters) is lower than −25 dBm, while the signal may range between −7 and −18 dBm.

The steps to maintain the tunable filter in correspondence of the signal are made in the same manner as described before.

According to an aspect, the present invention allows, separately, to be sure that the desired signal is present, by detecting the relevant tone, and to be sure that the detected signal is the desired one, by using the fixed filter.

We claim:

1. An optical telecommunication method comprising the steps of:
generating at least one optical transmission signal, at a predetermined wavelength included in a predetermined wavelength band;
transmitting said optical transmission signal through an optical fiber to a receiving station, comprising at least a receiving unit;
feeding an optical signal comprising said optical transmission signal to a respective one of the receiving units in said receiving station, through a passband filter, wherein said optical signal has a spectrum including at least one recognizable portion at a known wavelength in said predetermined wavelength band;
filtering said optical transmission signal from said optical signal at said filter so that said optical transmission signal passes through said filter, wherein said filter is a filter tunable on several wavelengths in a search band including said spectrum, by command means operable under several operating conditions, and said filtering comprises:
scanning said predetermined wavelength band by varying said operating conditions;
identifying said recognizable spectrum portion;
determining, based on the operating conditions corresponding to said recognizable spectrum portion, a search range for said transmission signal;
scanning said search range by varying said operating conditions;

recognizing said optical transmission signal in said search range and identifying the relevant operating conditions;

maintaining the operating conditions at said optical transmission signal; and receiving in said receiving unit the optical transmission signal passing through said filter.

2. An optical telecommunication method according to claim 1, characterized in that said steps of scanning said predetermined wavelength band and identifying said recognizabile spectrum portion comprise:

actuating said command means at at least two operating conditions corresponding to through-wavelengths of said filter included within said search band;

detecting the optical through-power values at each of said operating conditions; and identifying between said optical power values a value corresponding to said recognizable portion of said spectrum and the operating conditions thereof.

3. An optical telecommunication method according to claim 1, characterized in that said step of determining a search range comprises the step of determining, starting from the operating conditions of said recognizable portion, new operating conditions corresponding to a range of said spectrum in which said optical transmission signal can be individually present and applying said new operating conditions to actuation of said command means.

4. An optical telecommunication method according to claim 1 further comprising amplifying said signal at least once by at least one active-fiber optical amplifier having a spontaneous-emission spectrum in said band including at least one peak of known wavelength constituting said recognizable spectrum portion.

5. An optical telecommunication method according to claim 4, characterized in that said active-fibre amplifier comprises an erbium-doped fibre.

6. An optical telecommunication system comprising:

an optical-signal-transmitting station comprising means for generating transmission signals at at least two wavelengths included in a predetermined bandwidth and means for conveying said signals to a single optical fiber line;

a receiving station for receiving said optical signals; and an optical fiber line connecting said transmitting and receiving stations, characterized in that said optical-signal-receiving station comprises means for separating said transmission signals from said single optical fiber line comprising:

a signal splitter designed to split the incoming optical signal onto several optical outlets;

at least one tunable optical filter connected in series to at least one of said optical outlets, adapted to produce an outgoing optical output signal in a wavelength band of predetermined width based on optical wavelength signals present in a recognizable spectrum portion and comprising respective commandable actuator means;

means for receiving at least one portion of said outgoing optical output signal from said filter; and means for commanding said actuator means of said filter, in connection with said receiving means.

7. An optical telecommunication system according to claim 6 further comprising at least one active-fiber optical amplifier interposed along said optical fiber line.

8. An optical telecommunication system according to claim 7, characterized in that said amplifier is an erbium-doped active-fibre amplifier.

9. An optical telecommunication system according to claim 7, characterized in that said tunable filter is a filter of the Fabry-Perot type.

10. An optical telecommunication system according to claim 7, characterized in that said receiving means designed to receive at least one portion of said outgoing optical signal from said filter comprises a fused-fibre splitter, connected in series at the filter output, having an outlet connected with an optical check receiver.

11. An optical telecommunication system according to claim 10, characterized in that said optical check receiver comprises a photodiode for the electric detection of the at least one portion of said outgoing optical signal.

12. A device for a multi-wavelength optical reception comprising:

a signal splitter adapted to split an incoming optical signal onto several optical outlets;

at least one tunable optical filter connected in series to at least one of said optical outlets, adapted to produce an optical output signal in a wavelength band of predetermined width based on optical wavelength signals present in a recognizable spectrum portion and comprising respective commandable actuator means;

means for receiving at least one portion of said optical output signal from said filter; and means for commanding said actuator means for said filter, in connection with said receiving means.

13. A device for a multi-wavelength optical reception according to claim 12, characterized in that said tunable filter is a filter of the Fabry-Perot type.

14. A device for a multi-wavelength optical reception according to claim 12, characterized in that said means for receiving at least one portion of said optical output signal from said filter comprises a fused-fibre splitter connected in series at its exit from the filter, having an outlet connected to an optical check receiver.

15. A device for a multi-wavelength optical reception according to claim 14, characterized in that said optical check receiver comprises a photodiode for the electronic detection of the at least one portion of said optical signal.

16. An optical telecommunication method comprising the steps of:

generating at least one optical transmission signal, at a predetermined wavelength included in a predetermined wavelength band;

transmitting said optical transmission signal through an optical fiber to a receiving station, comprising at least a receiving unit;

feeding an optical signal comprising said optical transmission signal to a respective one of the receiving units in said receiving station, through a passband filter, wherein said optical signal has a spectrum including at least one recognizable portion at a known wavelength in said predetermined wavelength band;

filtering said optical transmission signal from said optical signal at said filter so that said optical transmission signal passes through said filter, wherein said filter is a tunable optical filter (Fabry-Perot) tunable on several wavelengths in a search band including said spectrum, by command means operable under several operating conditions, wherein said command means is embodied by piezoelectric actuators and wherein said filtering comprises:

scanning said predetermined wavelength band by varying said operating conditions;

identifying said recognizable spectrum portion;

determining, based on the operating conditions corresponding to said recognizable spectrum portion, a search range for said transmission signal;

scanning said search range by varying said operating conditions;

recognizing said optical transmission signal in said search range and identifying the relevant operating conditions;

maintaining the operating conditions at said optical transmission signal; and receiving in said receiving unit the optical transmission signal passing through said filter.

17. An optical telecommunication method according to claim 16, characterized in that said filtering step comprises:

applying to said actuators two or more piloting voltages included between the extreme values of predetermined voltages;

detecting the optical power values of the signal passing through the filter at said voltages;

recognizing said recognizable spectrum portion and the piloting voltage corresponding thereto;

modifying said predetermined extreme voltage values depending on the value of said piloting voltage corresponding to said recognizable portion;

repeating the cycle a predetermined number of times;

determining a search voltage range for a signal;

recognizing said signal in said range; and maintaining said filter at said signal.

18. An optical telecommunication method according to claim 17, characterized in that said recognizing step comprises:

applying to said actuators piloting voltages included in said search voltage range and detecting the optical through-powers corresponding thereto; and recognizing as a signal each maximum value of the optical through-power.

19. An optical telecommunication method according to claim 17, characterized in that said maintaining step comprises applying to said actuators the piloting voltage corresponding to said recognized maximum of optical power and periodically varying said voltage according to predetermined increments, by adopting the piloting voltage value corresponding to the detected maximum of optical through-power.

20. An optical telecommunication method according to claim 17, characterized in that said filtering step comprises varying the piloting voltage between said extreme values by means of a predetermined temporal law.

21. An optical telecommunication method according to claim 20, characterized in that said piloting voltage is varied according to increments fixed in time.

22. An optical telecommunication method according to claim 21, characterized in that said piloting voltage is varied according to a mean temporal gradient predetermined in each step.

23. An optical telecommunication method according to claim 16, characterized in that said recognizable spectrum portion includes a spontaneous-emission peak of erbium, at a wavelength included between 1530 and 1540 nm.

24. An optical telecommunication method comprising the steps of:

generating at least one optical transmission signal, at a predetermined wavelength included in a predetermined wavelength band;

transmitting said optical transmission signal through an optical fiber to a receiving station, comprising at least a receiving unit;

feeding an optical signal comprising said optical transmission signal to a respective one of the receiving units in said receiving station, through a passband filter, wherein said optical signal has a spectrum including at least one recognizable portion at a known wavelength in said predetermined wavelength band;

filtering said optical transmission signal from said optical signal at said filter so that said optical transmission signal passes through said filter, wherein said filter is a tunable optical filter tunable on several wavelengths in a search band including said spectrum, by command means operable under several operating conditions, and said filtering comprises:

scanning said predetermined wavelength band by varying said operating conditions;

identifying said recognizable spectrum portion;

determining, based on the operating conditions corresponding to said recognizable spectrum portion, a search range for said transmission signal;

scanning said search range by varying said operating conditions;

recognizing said optical transmission signal in said search range and identifying the relevant operating conditions, wherein said recognizing comprises:

detecting the optical power passing through the filter in a group of at least three consecutive operating conditions;

separating an optical through-power value detected at an intermediate operating condition between said consecutive operating conditions, from the optical through-power values detected at at least two external operating conditions, between which said intermediate condition is included;

calculating an optical interpolation power value at said intermediate operating condition;

comparing said detected optical through-power value with said optical interpolation power value;

recognizing as the operating conditions corresponding to the optical transmission signal, the intermediate operating conditions in which said detected optical through-power value and said optical interpolation power value are in a predetermined relation with respect to each other;

maintaining the operating conditions at said optical transmission signal; and receiving in said receiving unit the optical transmission signal passing through said filter.

25. An optical telecommunication method according to claim 24, characterized in that said predetermined relation comprises a higher ratio between said optical through-power value and said optical interpolation power value than a predetermined threshold value.

26. An optical telecommunication method according to claim 24, characterized in that said predetermined relation comprises a ratio between the integral of an interpolation curve of said optical through-power values detected at said consecutive operating conditions and the integral of an interpolation curve of said detected optical through-power values, except for the value or values corresponding to said intermediate operating condition or conditions in said group, said ratio being higher than a predetermined threshold value.

27. An optical telecommunication method comprising the steps of:

generating at least one optical transmission signal, at a predetermined wavelength included in a predetermined wavelength band;

transmitting said optical transmission signal through an optical fiber to a receiving station, comprising at least a receiving unit;

feeding an optical signal comprising said optical transmission signal to a respective one of the receiving units in said receiving station, through a passband filter, wherein said optical signal has a spectrum including at least one recognizable portion at a known wavelength in said predetermined wavelength band;

filtering said optical transmission signal from said optical signal at said filter so that said optical transmission signal passes through said filter, wherein said filter is a filter tunable on several wavelengths in a search band including said spectrum, by command means operable under several operating conditions, wherein said filtering comprises:

scanning said predetermined wavelength band by varying said operating conditions;

identifying said recognizable spectrum portion;

determining, based on the operating conditions corresponding to said recognizable spectrum portion, a search range for said transmission signal, wherein the step of determining the search range comprises:

determining, starting from the operating conditions of said recognizable portion, new operating conditions corresponding to a range of said spectrum in which said optical transmission signal can be individually present;

applying said new operating conditions to said actuators;

detecting a spontaneous-emission spectrum;

identifying the operating conditions corresponding to the extremes of said spontaneous-emission spectrum; and calculating the operating conditions corresponding to one portion of said spectrum in which said transmission signal can be individually localized;

scanning said search range by varying said operating conditions;

recognizing said optical transmission signal in said search range and identifying the relevant operating conditions;

maintaining the operating conditions at said optical transmission signal; and receiving in said receiving unit the optical transmission signal passing through said filter.

28. An optical telecommunication system comprising:

an optical-signal-transmitting station comprising means for generating transmission signals at at least two wavelengths included in a predetermined bandwidth and means for conveying said signals to a single optical fibre line;

a receiving station for receiving said optical signals;

an optical fibre line connecting said transmitting and receiving stations;

wherein said optical-signal-receiving station comprises means for separating said transmission signals from said single optical fibre line comprising:

a signal splitter designed to split the incoming optical signal onto several optical outlets;

at least one tunable optical filter connected in series to at least one of said optical outlets, adapted to produce an outgoing optical output signal in a wavelength band of predetermined width and comprising respective commandable actuator means;

means for receiving at least one portion of said outgoing optical output signal from said filter comprising a fused-fibre splitter connected in series at the filter output and having an outlet connected with an optical check receiver, wherein said fused-fibre splitter draws less than 5% of optical power to be sent to said optical check receiver; and means for commanding said actuator means of said filter, in connection with said receiving means.

29. An optical telecommunication system comprising:

an optical-signal-transmitting station comprising means for generating transmission signals at at least two wavelengths included in a predetermined bandwidth and means for conveying said signals to a single optical fibre line;

a receiving station for receiving said optical signals;

an optical fibre line connecting said transmitting and receiving stations;

wherein said optical-signal-receiving station comprises means for separating said transmission signals from said single optical fibre line comprising:

a signal splitter designed to split the incoming optical signal on several optical outlets;

at least one tunable optical filter of the Fabry-Perot type connected in series to at least one of said optical outlets, adapted to produce an outgoing optical output signal in a wavelength band of predetermined width, having a free spectral range, FSR, greater than or equal to the spontaneous-emission band of said erbium-doped active fiber and comprising respective commandable actuator means;

means for receiving at least one portion of said optical output signal from said filter; and means for commanding said actuator means of said filter, in connection with said receiving means.

30. A device for a multi-wavelength optical reception comprising:

a signal splitter adapted to split an incoming optical signal onto several optical outlets;

at least one tunable optical filter connected in series to at least one of said optical outlets, adapted to produce an optical output signal in a wavelength band of predetermined width, comprising respective commandable actuator means;

means for receiving at least one portion of said optical output signal from said filter; and means for commanding said actuator means for said filter, in connection with said receiving means, comprising a microprocessor unit adapted to generate a command action on the actuators in response to the filter output signal.

31. A device for a multi-wavelength optical reception comprising:

a signal splitter adapted to split an incoming optical signal onto several optical outlets;

at least one tunable optical filter connected in series to at least one of said optical outlets, adapted to produce an optical output signal in a wavelength band of predetermined width, comprising respective commandable actuator means, wherein said actuator means for said filter are piezoelectric actuators;

means for receiving at least one portion of said optical output signal from said filter; and means for commanding said actuator means for said filter, in connection with said receiving means.

32. A device for a multi-wavelength optical reception, characterized in that it comprises:

a signal splitter adapted to split an incoming optical signal onto several optical outlets;

at least one tunable optical filter connected in series to at least one of said optical outlets, adapted to produce an optical output signal in a wavelength band of predetermined width, comprising respective commandable actuator means;

means for receiving at least one portion of said optical output signal from said filter comprising a fused-fibre splitter connected in series at its exit from the filter and having an outlet connected to an optical check receiver, wherein said fused-fibre splitter draws less than 5% of optical power to be sent to said optical check receiver; and means for commanding said actuator means for said filter, in connection with said receiving means.

33. A device for a multi-wavelength optical reception comprising:

a signal splitter adapted to split an incoming optical signal on several optical outlets;

at least one tunable optical filter of the Fabry-Perot type connected in series to at least one of said optical outlets, adapted to produce an optical output signal in a wavelength band of predetermined width, having a free spectral range FSR greater than or equal to said predetermined band width and comprising respective commandable actuator means;

means for receiving at least one portion of said optical output signal from said filter; and means for commanding said actuator means for said filter, in connection with said receiving means.

* * * * *